US012608198B2

(12) United States Patent
Farquhar et al.

(10) Patent No.: US 12,608,198 B2
(45) Date of Patent: Apr. 21, 2026

(54) CROSS-PLATFORM CONTEXT-SPECIFIC AUTOMATION SCHEDULING

(71) Applicants: Atlassian Pty Ltd., Sydney (AU); Atlassian Inc., San Francisco, CA (US)

(72) Inventors: Scott Farquhar, Sydney (AU); Jonathan George Katahanas, Sydney (AU); Abhinav Kishore, Sydney (AU); Cornelis Jacobus Alant, Sydney (AU); John Duncan, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 629 days.

(21) Appl. No.: 17/563,748

(22) Filed: Dec. 28, 2021

(65) Prior Publication Data

US 2022/0405094 A1     Dec. 22, 2022

Related U.S. Application Data

(60) Provisional application No. 63/213,124, filed on Jun. 21, 2021.

(51) Int. Cl.
*G06F 8/76*          (2018.01)
*G06F 9/445*         (2018.01)
          (Continued)

(52) U.S. Cl.
CPC ............ *G06F 8/76* (2013.01); *G06F 9/44505* (2013.01); *G06F 9/4488* (2018.02); *G06F 9/451* (2018.02); *G06F 21/31* (2013.01)

(58) Field of Classification Search
CPC ...... G06F 8/76; G06F 9/44505; G06F 9/4488; G06F 9/451; G06F 21/31;
          (Continued)

(56) References Cited

U.S. PATENT DOCUMENTS 7,032,185 B1 *  4/2006  Yohanan ............... G06F 16/955
                                              707/E17.112
10,198,490 B2   2/2019  No et al.
          (Continued)

OTHER PUBLICATIONS

Lopez et al., "Triggerflow: Trigger-based Orchestration of Serverless Workflows," DEBS '20, Virtual Event, QC, Canada, 12 pages, Jul. 13-17, 2020.
          (Continued)

*Primary Examiner* — Mahran Y Abu Roumi
*Assistant Examiner* — Mariegeorges A Henry
(74) *Attorney, Agent, or Firm* — Brownstein Hyatt Farber Schreck, LLP

(57) ABSTRACT

A frontend of a platform of a multiplatform system can be monitored for user input. Upon receiving a user input that includes particular content, a data object describing the context in which the user input was provided may be created. One or more automations may be selected from an automation database based on a similarity to the determined context. The selected automations can be automatically displayed for the user, thereby encouraging the user to leverage automations across multiple platforms without requiring the user to switch between different platforms and without requiring the user to learn or understand platform-specific automation engines.

19 Claims, 18 Drawing Sheets

800

(51) Int. Cl.
*G06F 9/448* (2018.01)
*G06F 9/451* (2018.01)
*G06F 21/31* (2013.01)

(58) Field of Classification Search
CPC ....... G06F 2209/5017; G06F 2209/545; G06F 2209/549; G06F 9/4843; G06F 9/5072; G06F 9/542; G06Q 10/06316
USPC .......................................................... 709/205
See application file for complete search history.

(56) References Cited

U.S. PATENT DOCUMENTS

| | | | |
|---|---|---|---|
| 2012/0136927 A1* | 5/2012 | Dillon ................. | G06F 16/9574 |
| | | | 709/203 |
| 2013/0166721 A1* | 6/2013 | Soffer ..................... | H04L 51/52 |
| | | | 709/224 |
| 2015/0081624 A1* | 3/2015 | Masse .................. | G06Q 10/103 |
| | | | 707/608 |
| 2019/0004821 A1* | 1/2019 | Uppal ................. | G06F 3/04895 |
| 2020/0133711 A1* | 4/2020 | Webster ..................... | G06F 8/30 |
| 2021/0075749 A1* | 3/2021 | Viswanathan ............ | G06F 9/50 |
| 2022/0066773 A1* | 3/2022 | Mampilly ................. | G06F 8/77 |
| 2022/0291949 A1* | 9/2022 | Blohm .................. | G06F 9/5038 |
| 2022/0350641 A1* | 11/2022 | Gilmore ............. | G06F 11/3688 |

OTHER PUBLICATIONS

Zapier, "Zapier 101—How to build automated workflows & connect your apps to each other with Zapier," https:/www.youtube.com/watch?v=POWlaxuQpk, 1 page, Feb. 25, 2020.

* cited by examiner

200

200

300

300

300

300

300

300

300

400
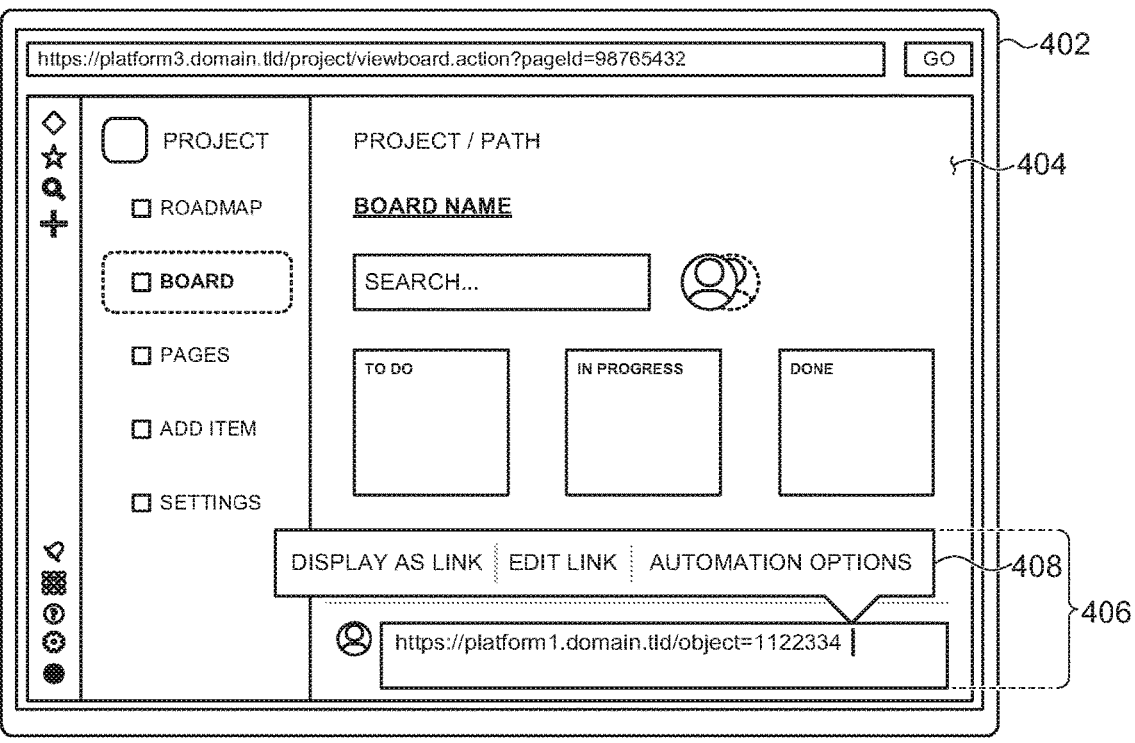
FIG. 4A

400

400

400

400

500

600

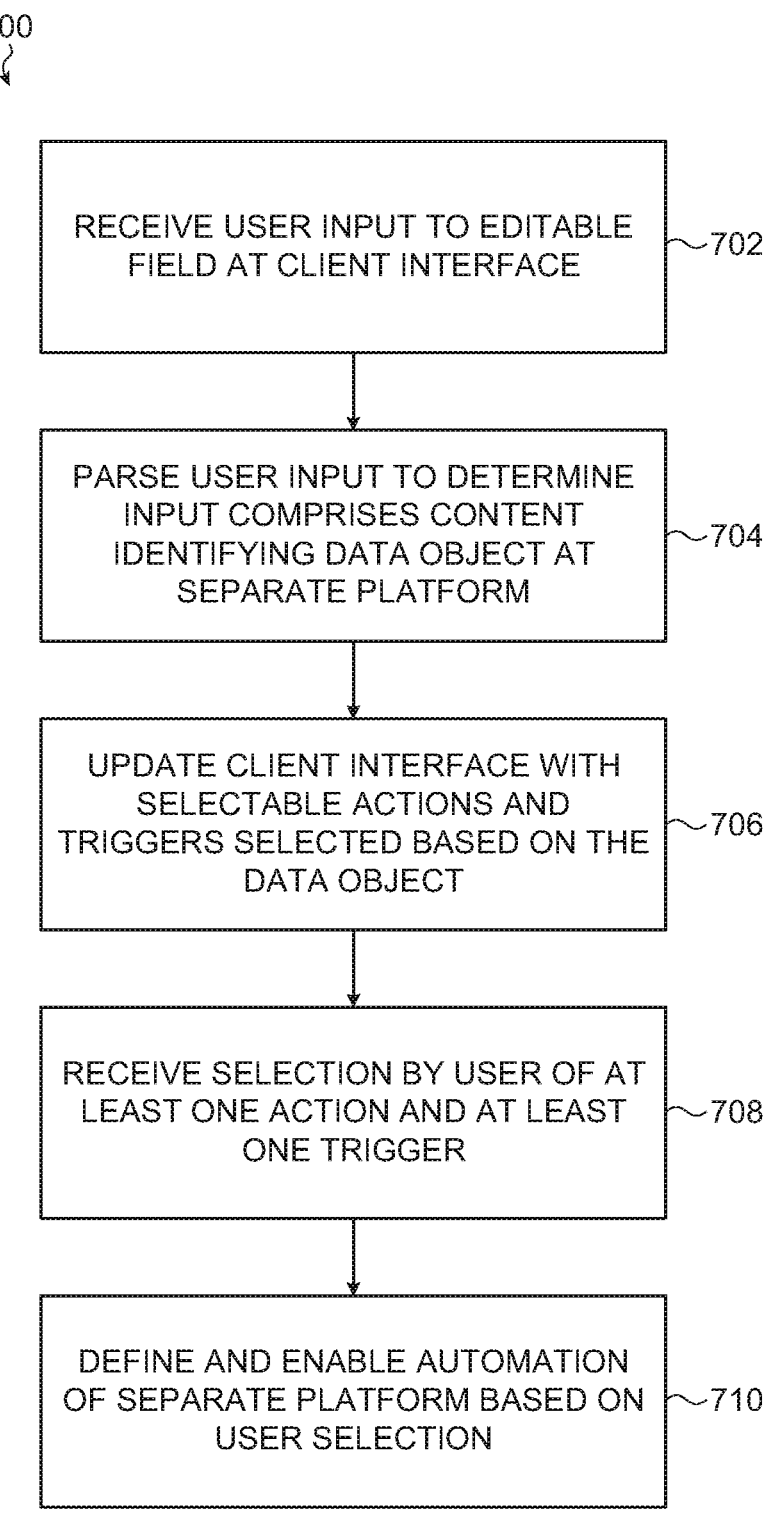

700

RECEIVE USER INPUT TO EDITABLE FIELD AT CLIENT INTERFACE —702

PARSE USER INPUT TO DETERMINE INPUT COMPRISES CONTENT IDENTIFYING DATA OBJECT AT SEPARATE PLATFORM —704

UPDATE CLIENT INTERFACE WITH SELECTABLE ACTIONS AND TRIGGERS SELECTED BASED ON THE DATA OBJECT —706

RECEIVE SELECTION BY USER OF AT LEAST ONE ACTION AND AT LEAST ONE TRIGGER —708

DEFINE AND ENABLE AUTOMATION OF SEPARATE PLATFORM BASED ON USER SELECTION —710

RECEIVE USER INPUT TO EDITABLE FIELD AT CLIENT INTERFACE ~802

PRESENT AUTOMATION SELECTION INTERFACE ~804

RECEIVE AUTOMATION SELECTION BY USER OF FIRST PLATFORM ~806

CREATE EVENT OBJECT TO AUTOMATE ACTION OF SECOND PLATFORM BASED ON AUTOMATION SELECTION ~808

CROSS-PLATFORM CONTEXT-SPECIFIC AUTOMATION SCHEDULING

CROSS-REFERENCE TO RELATED APPLICATION(S)

This application is nonprovisional patent application of and claims the benefit of U.S. Provisional Patent Application No. 63/213,124, filed on Jun. 21, 2021 and entitled "Cross-Platform Context-Specific Automation Scheduling," the disclosure of which is hereby incorporated herein by reference in its entirety.

TECHNICAL FIELD

Embodiments described herein relate to multitenant services of collaborative work environments and, in particular, to systems and methods for suggesting, scheduling, and/or triggering context-specific automations between different platforms.

BACKGROUND

An organization can establish a collaborative work environment by self-hosting, or providing its employees with access to, a suite of discrete software platforms or services to facilitate cooperation and completion of work. In many cases, the organization may also define policies outlining best practices for interacting with, and organizing data within, each software platform of the suite of software platforms.

Often, internal best practice policies require users to interact with and copy data or status information between multiple platforms to comprehensively complete a single task. This requirement that is both time and resource consuming for employees, reducing overall team and individual productivity

SUMMARY

Embodiments described herein can take the form of a method for suggesting and/or scheduling context-relevant automations in a second platform from a first platform of a multiplatform software environment. In a more general phrasing, a user of a first software platform can, from a user interface associated with the first software platform, trigger and/or schedule one or more automations of the second software platform.

As a result of architectures described herein, a user of the first platform can interact with the second platform without needing to context switch between platforms and without needing experience in automating or interacting with the second platform. These systems and methods can dramatically improve efficiency of users interacting with multiple platforms in a multiplatform software environment.

For example, in one embodiment, a first software platform can be defined, at least in part, by a processor allocation and a memory allocation operable to instantiate an instance of a software application providing server-side (backend) functionality of the first software platform.

The backend software application (or, simply, the first platform "backend") can be configured to interface, and/or communicate, with a corresponding instance of a software application instantiated on a client device, such as a cellular phone, tablet, or computer. The second software application may be configured to provide client-side (frontend) functionality for the first software platform. In many cases, the frontend software application (or, simply, the first platform "frontend") may generate a user interface with which a user of the first platform can interact.

In many examples, the user may leverage one or more editable fields rendered in the graphical user interface to provide input to the first software platform. The input is received by the frontend, and is communicated to the backend. The backend receives the input and may store the input in a database and/or otherwise process the input in accordance with a function of the first software platform.

In these embodiments, a user may from time to time provide an input that references or directly includes data stored by or managed by another software platform different from the first software platform. As one example, the user may paste a uniform resource location (URL) into the frontend of the first software platform that links to a data object or page of a different software platform. In another example, the user may type an identifier, title, or name into the frontend of the first software platform that references a data object or page of a different software platform.

In these examples, either or both the frontend or the backend of the first software platform can process the user input to identify one or more software platforms referenced in the user input. Once the second software platform is identified, the user interface of the first software platform can be modified to display for the user (e.g., via a floating window) one or more suggested actions or automations related to the referenced data that may be scheduled in the second software platform. In further examples, the suggested actions or automations related to the referenced data may be scheduled in a third software platform, different from the second software platform.

In some examples, the automations presented to the user may be based on common automations selected by other users of the multiplatform system when those users referenced similar content (or content types) of the second software platform in the first software platform. In these embodiments, a relationship or "context" may be defined based on, as one example: (1) what type of content is referenced; (2) what platform was used to reference the content; (3) what platform hosts the referenced content; and so on. In a more simple phrasing, in some embodiments, one or more automations may be presented to the user based on a determined context in which the user provides input.

In other examples, the automations presented to the user may be based on preconfigured automations defined by an organization, or defined by a maintainer or provider of the first platform or the second platform. In yet other examples, the automations presented to the user of the first platform may be based on one or more user preferences, team preferences, manager preferences, or any other suitable preference.

In yet other examples, the user may be presented with an option to customize an automation to be performed by the first platform and/or the second platform in response to a trigger event selected by the user. In such examples, the user may be presented with one or more templates to assist with custom automations or the user may be presented with a graphical user interface to customize both trigger events, conditions to those trigger events, and resulting automations, sequences of automations, and so on.

As a result of these and other described constructions, a user of any platform in a multiplatform system can quickly and easily create and/or schedule ad hoc automations of any platform within that multiplatform system without specific or preexisting knowledge of automation engines, languages, or options of any of those platforms.

Further embodiments described herein may take the form of a method of scheduling automation of a first software platform from a second software platform. The method may include operations of: receiving, at a client interface of the second software platform, a user input to an editable field rendered in the client interface; parsing the user input to determine that the user input includes content identifying a data object of the first software platform; presenting by the client interface an interface element displaying (1) a selectable item based at least in part on the content and referencing an action to be performed by the first software platform in response to a trigger event and (2) a set of trigger events based at least in part on the content and each corresponding to a respective one state change of the data object and receiving at the client interface a selection of the selectable item and at least one trigger event of the set of trigger events; and defining and enabling an automation in the first software platform to cause the first software platform to perform the action in response to occurrence of each of the at least one trigger events.

Related and additional embodiments may include a configuration in which the content includes an address, such as a URL, pointing to the data object of the first software platform.

Some related and additional embodiments may include a configuration in which the content includes at least one of: a title associated with the data object; a user of the second software platform associated with the data object; string content associated with the software platform; and an identifier of the data object.

Certain related and additional embodiments may include a configuration in which the method includes an operation of identifying a second data object of the second data platform, the second data object associated with, and/or referenced by or in, the editable field, and defining an input context (e.g., as a data object or computer readable class instance) based on the first data object and the second data object. In such examples, the selectable item and/or the set of trigger events may be based at least in part on the input context.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 4A depicts a graphical user interface that can receive user input and that is rendered by a frontend of a separate software platform from the software platform depicted in FIG. 1.

FIG. 7 is a flowchart depicting example operations of a method of selecting automations to present to a user of a multiplatform system, such as described herein.

The use of the same or similar reference numerals in different figures indicates similar, related, or identical items.

Figure 1:
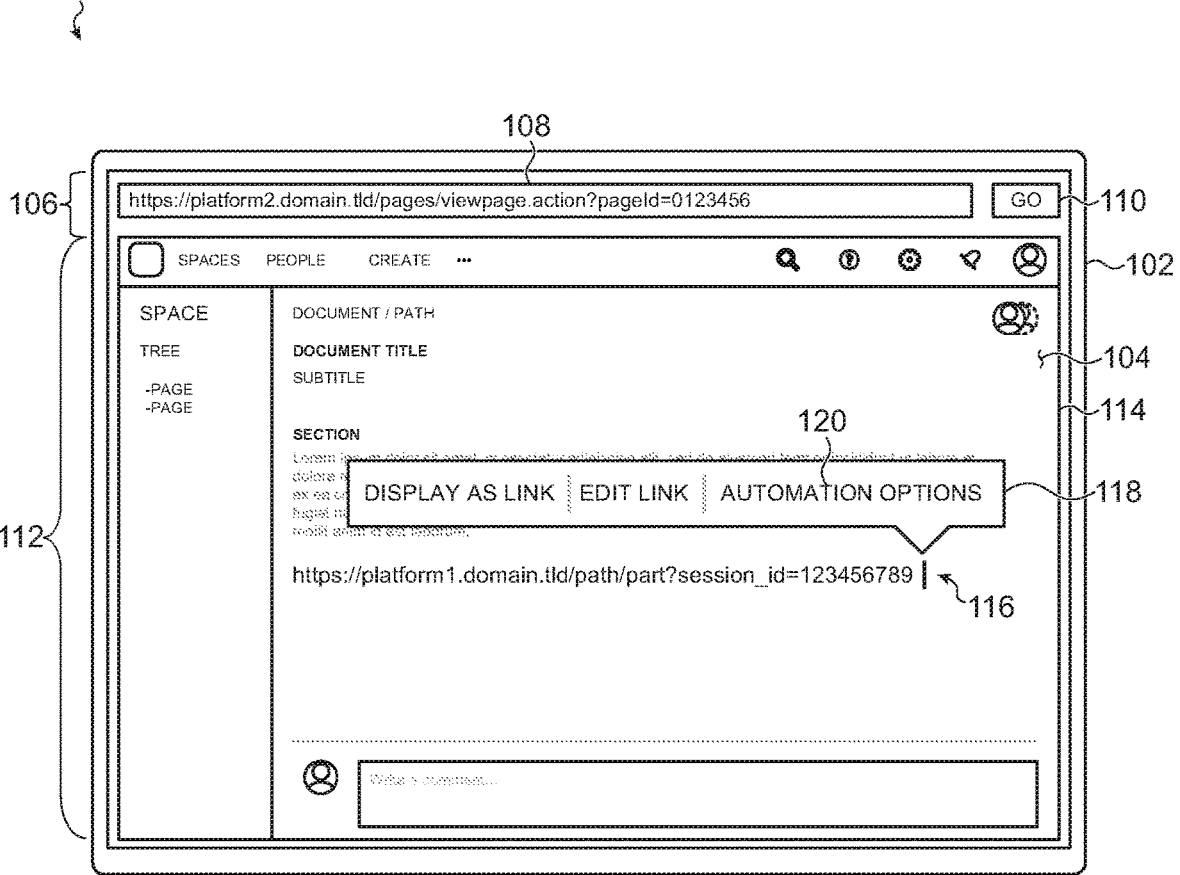
FIG. 1 depicts a graphical user interface that can receive user input and that is rendered by a frontend of a software platform, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for scheduling and/or triggering automations against and with tenant-owned content that may be created, and later accessed, when sharing information or cross-linking information stored or owned by multiple software as a service platform (individually, herein a "software platform" or a "multitenant software platform").

A software platform as described herein may include a frontend and a backend configured to communicably couple over a computing network (which may include the open Internet) to exchange computer-readable structured data.

The frontend may be a first instance of software executing on a client device, such as a desktop computer, laptop computer, tablet computer, or handheld computer (e.g., mobile phone). The backend may be a second instance of software executing over a processor allocation and memory allocation of a virtual or physical computer architecture. In many cases, although not required, the backend may support multiple tenancies. In such examples, a software platform may be referred to as a multitenant software platform.

For simplicity of description, the multitenant embodiments presented herein reference software platforms from the perspective of a single common tenant. For example, as known to a person of skill in the art, an organization may secure a tenancy of multiple discrete software platforms, providing access for one or more employees to each of the software platforms. Although other organizations may have also secured tenancies of the same software platforms which may instantiate one or more backends that serve multiple tenants, it is appreciated that data of each organization is siloed, encrypted, and inaccessible to, other tenants of the same platform.

In many embodiments, the frontend and backend of a software platform—multitenant or otherwise—as described herein are not collocated, and communicate over a large area and/or wide area network by leveraging one or more networking protocols, but this is not required of all implementations.

A frontend of a software platform as described herein may be configured to render a graphical user interface at a client device that instantiates frontend software. As a result of this architecture, the graphical user interface of the frontend can receive inputs from a user of the client device, which, in turn, can be formatted by the frontend into computer-readable structured data suitable for transmission to the backend for storage, transformation, and later retrieval. One example architecture includes a graphical user interface rendered in a browser executing on the client device. In other cases, a frontend may be a native application executing on a client device. Regardless of architecture, it may be appreciated that generally and broadly a frontend of a software platform as described herein is configured to render a graphical user interface to receive inputs from a user of the software platform and to provide outputs to the user of the software platform.

Input to a frontend of a software platform by a user of a client device within an organization may be referred to herein as "organization-owned" content. With respect to a particular software platform, such input may be referred to as "tenant-owned" or "platform-specific" content. In this manner, a single organization's owned content can include multiple buckets of platform-specific content.

Herein, the phrases "tenant-owned content" and "platform-specific content" may be used to refer to any and all content, data, metadata, or other information regardless of form or format that is authored, developed, created, or otherwise added by, edited by, or otherwise provided for the benefit of, a user or tenant of a multitenant software platform. In many embodiments, as noted above, tenant-owned content may be stored, transmitted, and/or formatted for display by a frontend of a software platform as structured data. In particular structured data that includes tenant-owned content may be referred to herein as a "data object" or a "tenant-specific data object." In a more simple, non-limiting phrasing, any software platform described herein can be configured to store one or more data objects in any form or format unique to that platform. Any data object of any platform may include one or more attributes and/or properties or individual data items that, in turn, include tenant-owned content input by a user.

Example tenant-owned content can include personal data, private data, health information, personally-identifying information, business information, trade secret content, copyrighted content or information, restricted access information, research and development information, classified information, mutually-owned information (e.g., with a third party or government entity), or any other information, multimedia, or data. In many examples, although not required, tenant-owned content or, more generally, organization-owned content may include information that is classified in some manner, according to some procedure, protocol, or jurisdiction-specific regulation.

In particular, the embodiments and architectures described herein can be leveraged by a provider of multitenant software and, in particular, by a provider of suites of multitenant software platforms, each platform being configured for a different particular purpose. Herein, providers of systems or suites of multitenant software platforms are referred to as "multiplatform service providers."

As known to a person of skill in the art, customers/clients of a multiplatform service provider are typically tenants of multiple platforms provided by a given multiplatform service provider. For example, a single organization (a client of a multiplatform service provider) may be a tenant of a messaging platform and, separately, a tenant of a project management platform. The organization can create and/or purchase user accounts for its employees so that each employee has access to both messaging and project management functionality. In some cases, the organization may limit seats in each tenancy of each platform so that only certain users have access to messaging functionality and only certain users have access to project management functionality; the organization can exercise discretion as to which users have access to either or both tenancies.

In another example, a multiplatform service provider can host a suite of collaboration tools. For example, a multiplatform service provider may host, for its clients, a multitenant issue tracking system, a multitenant code repository service, and a multitenant documentation service. In this example, an organization that is a customer/client of the service provider may be a tenant of each of the issue tracking system, the code repository service, and the documentation service. As with preceding examples, the organization can create and/or purchase user accounts for its employees, so that certain selected employees have access to one or more of issue tracking functionality, documentation functionality, and code repository functionality.

In this example and others, as known to a person of skill in the art, it is exceptionally common to leverage multiple collaboration tools to advance individual projects or goals. For example, for a single software development project, a software development team may use (1) a code repository to store project code, executables, and/or static assets, (2) a documentation service to maintain documentation related to the software development project, (3) an issue tracking system to track assignment and progression of work, and (4) a messaging service to exchange information directly between team members.

However, as organizations grow, as project teams become larger, and/or as software platforms mature and add features or adjust user interaction paradigms over time, using multiple software platforms can become inefficient for both individuals and organizations. To counteract these effects, many organizations define internal policies that employees are required to follow to maintain data freshness across the various platforms used by an organization. For example, when a developer submits a new pull request to a repository service, that developer may also be required by the organization to (1) update a description of the pull request in a documentation service, (2) change a project status in a project management application, and/or (3) close a ticket in a ticketing or issue tracking system relating to the pull request. In many cases, as known to a person of skill in the art, updating and interacting with multiple platforms on a regular and repeating basis is both frustrating and time consuming for both individuals and organizations, especially if the completion of work of one user is dependent upon completion of work of another user.

Some solutions to these and related problems often introduce further issues and complexity. For example, many software platforms include an in-built automation engine that can expedite performance of work within that software platform. In many cases, however, users of a software platform with an in-built automation engine may not be familiar with the features of the automation engine, nor may those users understand how to access, much less efficiently utilize, that automation engine. For example, in many cases, accessing in-built automation engines of a software platform requires diving deep into a settings or options menu, which may be difficult to find.

Other solutions involve an inter-platform bridge software that allows data from one platform to be accessed by another platform. Typically, such bridging software is referred to as an "integration" between platforms. An integration between different platforms may allow content, features, and/or functionality of one platform to be used in another platform.

For example, a multiplatform service provider may host an issue tracking system and a documentation system. The provider may also supply an integration that allows issue tracking information and data objects to be shown, accessed, and/or displayed from within the documentation system. In this example, as may be clear to a person of skill in the art, the integration itself needs to be separately maintained in order to be compliant with an organization's data sharing and/or permissions policies. More specifically, an integration must ensure that authenticated users of the documentation system that view a page that references information stored by the issue tracking system are also authorized to view that information by the issue tracking system.

Phrased in a more general way, an architecture that includes one or more integrations between tenancies of different software platforms requires multiple permissions requests that may be forwarded to different systems, each of which may exhibit different latencies, and have different response formats, and so on. More broadly, some system architectures with integrations between software platforms necessarily require numerous network calls and requests, occupying bandwidth and computational resources at both software platforms and at the integration itself, to simply share and request information and service requests for information by and between the different software platforms. This architectural complexity necessitates careful management to prevent inadvertent information disclosure.

Furthermore, the foregoing problem(s) with maintaining integrations' compliance with an organization's policies and organization-owned content access policies may be exacerbated as a provider's platform suite grows. For example, a provider that maintains three separate platforms may choose to provide three separate integrations interconnecting all three platforms. (e.g., 3 choose 2). In this example, the provider is also tasked with maintaining policy compliance associated with those three platforms and three integrations. If the provider on-boards yet another platform, a total of six integrations may be required (e.g., 4 choose 2). If the provider on-boards a fifth platform, a total of ten integrations may be required (e.g., 5 choose 2). A person of skill in the art can readily understand that the difficulties of maintaining integrations between different software platforms (in a permissions policy compliant manner) scales exponentially with the number of platforms provided.

Further to the inadvertent disclosure risk and maintenance obligations associated with inter-platform integrations, each integration is still only configured for information sharing, and not automation of tasks. Although context switching to copy data between two integrated platforms may be reduced, the quantity of tasks required of individual users may not be substantially reduced.

Further solutions involve creating and deploying dedicated automation platforms that may be configured to operate with one, and/or perform automations of, or more platforms of a multiplatform system. These, however, much like automation engines in-built to individual platforms, may be difficult to use, access, or understand. Similarly, much like integrations described above, dedicated automation platforms require separate maintenance and employee training, in addition to licensing costs and physical or virtual infrastructure allocations to support the automation platform(s).

In still further other circumstances, many automations may take longer for a user to create than the time saved by automating that particular task. In these examples, individual users may avoid defining automations altogether, despite that, in aggregate, automation of a given task may save an organization substantial time and cost.

Embodiments described herein address these and other problems presented by systems by monitoring user input fields rendered by frontends of each software platform in order to detect user input events that may signal an opportunity for automation in one or more platforms of a multi-platform system of a given organization. In particular, when a user input event to an editable field is received, the user input may be analyzed to determine its content and, additionally, data describing circumstances of the input event itself may be recorded and memorialized as attributes of a "context object." This context object may be used to search through a database of automations for automations that have been enabled, defined, or otherwise used by other users in a similar context. These selected automations, found to be useful by other users given the same context, may be presented via the frontend to the user that provided the original user input event.

In this manner, and as a result of the methods described herein, a user interacting with a frontend of a particular platform may be automatically presented with context-relevant automation suggestions that may extend across different platforms. More specifically, the automations presented to the user may be automations in the platform with which the user is interacting and/or the automations presented to the user may be automations for a different platform, such as a platform referenced by the user input itself.

As a result of these constructions, a user interacting with a platform can be automatically presented with exceptionally relevant automation suggestions (of that platform or others), without that user having to switch context at all.

For example, a user operating a frontend of a documentation system may paste, into a user-editable field (rendered in a graphical user interface of the frontend), a cross-link or URL to an issue tracked by an issue tracking system.

Once the paste event occurs, the user may be presented with a series of suggested automations, each of which may be contextually relevant to the user. Phrased in another manner, each suggested automation relates at least in part to the context in which, or by which, that URL was pasted by the particular user into the particular field of the particular frontend.

In this example, the context may be based on, or defined by, one or more of: the documentation system; the issue tracking system; the issue referenced by the URL; a page or section of a page of the documentation system into which the user pasted the URL; the user-editable field into which the URL was pasted; and so on.

In this example, the user may be presented with three suggested automations. A first suggestion may be an automation to send an email notification back to the user every time the issue referenced by the URL is updated in a particular manner (e.g., by a particular person, to a particular status, and so on). A second automation suggestion may be to send a text message to the user's supervisor whenever the issue referenced by the URL is closed. In yet another example, the user may be presented with an automation suggestion to automatically reformat the display of the URL in the frontend of the documentation system based on a status of the issue referenced by the URL (e.g., change a color of the URL when displayed in the frontend of the documentation system in response to the issue status changing from open to closed).

These foregoing examples are not exhaustive; it may be appreciated in view of the various embodiments described herein that any number of contextually-relevant automations, automation suggestions, or automation templates can be presented to a user in response to detecting a user input event and determine a context of that user input event, as described herein.

As noted above, the automations presented to the user of the preceding example may be of particular contextual relevance to that user. More specifically, as noted above, automation suggestions may be selected or created and presented to the user based, at least in part, on a detected context of the user input event.

For example and further to the foregoing example, in response to detecting occurrence of the paste event in the user-editable field, a context object can be defined including one or more attributes or properties describing the circumstances in which the user input event was received and, additionally, describing the content of the user input event itself.

For example, a context object created to describe the circumstances of the preceding example user input event may include attributes memorializing: that the input was provided to the documentation system; that the input contained a URL; that the URL pointed to a data object of the issue tracking system; an identity of the user providing the input; a role of the user providing the input; a type or identity of the user editable field into which the user input was received; and so on.

It may be appreciated that these foregoing example attributes/properties are not exhaustive; a context object can be defined in a number of suitable ways and may take a number of suitable forms.

Regardless how a context object is formatted or defined, once a context object relating to a particular user input event is defined, that context object can be used to search a database of automations that are associated with similar, or related, contexts. In turn, these automations can be presented directly to the user for selection, modification, and/or activation.

As may be appreciated by a person of skill in the art, these systems and architectures can encourage users in a multiplatform system to automate portions of their respective workflows on an ad hoc, and ongoing, basis without requiring the user to create any automations, switch context from a working frontend in order to create or define an automation, to locate and operate an in-built automation engine, and so on; implementations of embodiments described herein may result in a substantial increase in overall productivity across an organization.

Phrased in a broader and more general manner, a user of a frontend of a platform of a multiplatform system, as described herein, may provide from time to time an input to an editable field of that platform. One example is pasting a link to an object of another platform. In response to receiving the input, a set of contextually-relevant automations (in either this platform or another) can be presented for selection, modification, and/or activation. By automatically generating a user interface to suggest contextually-relevant automations to users in a multiplatform system, overall leverage of automations, regardless of platform, may dramatically increase across an organization.

For simplicity of description, many embodiments that follow reference example use cases in which user input is provided by pasting text content into a user-editable field. It may be appreciated, however, that this is merely one example use case and that user input(s) can be received in a number of suitable ways.

As noted above, a "context" or context object such as described herein, may inform which automation suggestions are presented to a user of a given frontend. A context may be defined in a number of ways, taking into consideration any number of variables or metadata, calculated or queried or otherwise obtained from any suitable source or combination of sources.

Further, for embodiments described herein, an "automation" may be defined as an automatically-performed series of actions executed by one or more backends and/or frontends of one or more platforms of a multiplatform system, all performed within an organization's tenancies of those platforms.

In some cases, although not required, an automation may be additionally configured to access one or more third-party services or data sources, such as a mapping service, a weather service, a rideshare service, telephony service, and so on.

In many implementations, an automation as described herein is triggered in response to a particular event and/or set of conditions being met. In some cases, an automation can be associated with two or more triggering events and/or two or more conditions or states of any suitable object of any suitable platform. As may be appreciated by a person of skill in the art, when at least one triggering event occurs, or at least one condition is met, all associated and enabled automations may be performed by relevant platforms' frontends and/or backends.

In some embodiments, automations as described herein can be defined as automation objects which are structured data (or another computer-readable object) and may be stored, transmitted, modified, and/or analyzed in a manner similar to any other structured data. More simply, automation objects as described herein can be stored in, and accessed from, a database.

An automation object can include multiple attributes, which may include or reference (1) one or more triggers or conditions (from one or more platforms), (2) one or more actions (in one or more platforms) to be performed in response to the triggers/conditions, and (3) a context object, such as described above. In some examples, a single automation may be associated with multiple contexts; an automation object may include an array of context objects in some embodiments.

Furthermore, as may be appreciated by a person of skill in the art, a set of attributes of any given data object—such as an automation object or a context object, as described above—can be represented as a vector. In turn, different vectors can be compared for similarity using a suitable method (e.g., cosine similarity). In other words, the closer that two attribute vectors of two different objects are, the more similar those objects are likely to be. In this manner, comparing a context object generated in response to a user input (such as described above) to a context object of an automation stored in an automation database as described above can determine whether that automation is contextually appropriate to suggest to the user that provided the original user input.

Still further embodiments can be configured in other ways. For example, in some cases, a consumer of content (e.g., a user reviewing existing tenant-owned content) may be presented with automation suggestions, such as described herein, that are based on a context in which the consuming user views and/or access that content. For example, if the user accesses a page of a first platform that includes a URL pointing to a second platform, the user can be presented with automation suggestions based on the URL, the first platform, or the second platform without needing to provide input to the first platform, such as described with respect to other embodiments described herein.

As a result of the described embodiments presented herein, and equivalents thereof, context-relevant automation options can be presented to both producers and consumers of content in a multiplatform system. This automatic presentation of automation options can dramatically increase the number of users in a multiplatform system that automate one or more workflows.

As one example, a software developer may from time to time discover a bug in software maintained by that developer. According to organization policy and/or best practices, the developer may launce an instance of an issue reporting service in order to create a new issue report. Once the issue report is created, the developer may launch a project management application in order to adjust one or more project timelines based on the time required to fix the identified software bug; when adjusting the timeline, the developer may paste a link to the newly-created issue report as a justification for changing project timelines.

In some cases, the developer may also launch a documentation service to inform other team members that a particular portion of the software contains a bug and should not be used until that bug is fixed. Thereafter, the developer may leverage a messaging application to send a note to a second developer asking whether that developer can address the identified bug. Finally, the developer may launch a task management application to reminder him or herself to check back with the second developer in a few hours.

This preceding example involves substantial context switching, and reduces the developer's productivity.

Leveraging an embodiment as described herein, the developer may create the issue report and copy a link to the issue report before switching to the project management application. Once in the project management application, a system as described herein can monitor user input to the project management application, specifically, the system can monitor for paste events. Once the developer pastes a link to the newly-created issue report, an overlay window may be shown suggesting to the developer one or more actions based on, as one example, historical use.

For example, the overlay may note and/or suggest "historically, when YOU have pasted an ISSUE REPORT LINK into a PROJECT PAGE of the PROJECT MANAGEMENT SYSTEM, you send a message to USER2 via MESSAGING PLATFORM—would you like to author a message to USER2?" In another case, the overlay may suggest: "when other mid-level developers paste an ISSUE REPORT LINK has been created in the last 30 minutes into a PROJECT PAGE, typically they add a back-link to the PROJECT PAGE into the ISSUE REPORT. Would you like to add a backlink to this PROJECT PAGE in the ISSUE REPORTING PLATFORM?" In another case, the overlay may suggest: "For other PROJECT PAGES you manage that link to ISSUE REPORTS with a status of ACTIVE, you have scheduled a weekly reminder. Schedule weekly reminder to check status of the ISSUE REPORT?" In another case, the overlay may suggest: "Modifying a PROJECT TIMELINE requires approval by MANAGER or ADMIN. Send a message to MANAGER or ADMIN requesting permission?" In another case, the overlay may suggest: "When STATUS of the ISSUE REPORT identified by the ISSUE REPORT LINK changes to CLOSED, would you like to notify members of TEAM via MESSAGING PLATFORM and restore the PROJECT TIMELINE to its original schedule?" In another case, the overlay may suggest: "If STATUS of ISSUE REPORT does not change for TWO WEEKS, would you like to send a MESSAGE to yourself and set PRIORITY of ISSUE REPORT to HIGH?"

In yet other examples, other contextually relevant automation suggestions may be provided to the developer—all from an overlaid user interface rendered in a frontend of the project management application. In this manner, the developer can automate actions of a messaging platform, the issue tracking platform, and others all without leaving the project management application or knowing how to access or operate in-built automation engines of each discrete and separate platform.

As described herein, automation suggestions provided to a user are based on context in which the user interacts with a particular platform when providing input to that platform. Information that can inform or influence context, and/or content of a context object as described herein, can include one or more platforms, one or more platform types, one or more users, one or more user teams, one or more user roles, input types, media types, media content, semantic content, time of day, physical location, and so on. For example, a context in which a senior developer copies an issue report link to paste into a documentation service may be different than a junior developer copying an issue report link to paste into the same documentation service; in other words, different roles in this example may be presented with different automations.

Similarly, a context in which a senior developer messages a junior developer while pasting a link to an issue report may be different than a context in which marketing executive pastes a link to a documentation page. In this example, as with others, different contexts may cause different automation suggestions to be presented to a user.

In another example, a senior developer sending a message at close of business to a colleague may trigger different automation suggestions than a junior developer responding to an email at the start of the day.

Each of these and other foregoing contexts can be defined as data objects which in turn can be compared using a suitable method to other context objects and one or more automations that are associated with similar contexts. In this manner, as an organization grows and as more users create automations, the quantity of automations associated with particular contexts may increase. In these examples, a single context may be associated with multiple automations; in such examples, many automations can be presented to a user. These automations may be filtered and/or sorted based on historical use by other users (e.g., popular automations emphasized), historical use by the user that provided the input, based on administrative or management preferences, based on one or more organizational policies, and so on.

These foregoing and other embodiments are discussed below with reference to FIGS. 1-8. However, those skilled in the art will readily appreciate that the detailed description given herein with respect to these figures is for explanation only and should not be construed as limiting.

FIG. 1 depicts a graphical user interface that can receive user input and that is rendered by a frontend of a software platform, such as described herein. The software platform may be any suitable software platform. An example software platform may be a collaboration tool that is one of a suite of collaboration tools defining a collaborative work environment.

Example collaboration tools can include, without limitation: messaging services; telecommunication services; videoconferencing services; issue tracking services; repository services; documentation services; document management systems; knowledge sharing systems; project management services; enterprise resource planning services; supply chain management services; and so on.

In the illustrated embodiment, the software platform is a documentation service, although it is appreciated that this is merely one example.

In particular, the documentation service of FIG. 1 includes a client device 100. The client device 100 can be any suitable electronic device; examples include a desktop or laptop computing device. In other examples, the client device 100 may be a mobile device such as a tablet or a cellular phone. It may be appreciated that these example electronic devices are not exhaustive; any suitable device may be a client device as described herein.

The client device 100 may include a processor and a memory. The processor may be any suitable computing device or logical circuit configured to execute one or more instructions to perform or coordinate one or more operations on or to digital data. In many embodiments, the processor or processors of the client device 100 may be a physical processor, although this is not required of all embodiments; virtual components may be suitable in some implementations.

Similarly, a memory of the client device 100 may be configured and/or implemented in a number of suitable ways and may be partially or completely virtualized.

In typical examples, the processor of the client device 100 is configured to access at least one executable asset from the memory of the client device 100. More particularly, the processor of the client device 100 may be configured to access a data store portion of the memory to load, into a working portion of the memory, at least one executable asset or executable program instruction. In response to loading the instruction or executable asset into working memory, the processor of the client device 100 may instantiate an instance of software referred to herein as a client application.

In many embodiments, a client application (also referred to as a "frontend") may be configured to provide client-side functionality of a software platform (a documentation service, for FIG. 1). More specifically, the client application may be configured to communicably couple to a separate instance of software executing on, and/or instantiated by, a host system or server configured to provide server-side ("backend") functionality of the software platform (documentation service). In this manner, the documentation service is defined in part by a frontend executing/instantiated on a client device and in part by a backend executing/instantiated on a host server in communication with the frontend.

In some cases, the host server supporting the backend is configured to operate within, or as, a virtual computing environment that is supported by one or more physical servers including one or more hardware resources such as, but not limited to (or requiring) one or more of: a processor allocation; a memory allocation (also referred to as a working memory); non-volatile storage (also referred to as persistent memory); networking connections; and the like.

Further, it may be appreciated that although referred to as a singular "server", a host server supporting the backend may be a cluster of different computing resources, which may be geographically separated from one another.

In this manner, because specific implementations may vary, both the host server and the client device 100 can be referred to, simply, as "computing resources" configured to execute purpose-configured software (e.g., the frontend and the backend).

As used herein, the general term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

In view of the foregoing, it may be appreciated that the documentation service of FIG. 1 can include both a host server (not shown in FIG. 1 for simplicity of illustration) and the client device 100. Both the client device 100 and the host server each execute different instances of software that are communicably coupled over a computing network. Specifically, as noted above, the host server executes a backend software application and the client device executes a frontend software application, thereby cooperatively defining the documentation service.

The backend and the frontend of the documentation service (or any other software service described herein) can communicate according to any suitable protocol, form, or format. In many examples, the backend at least partially exposes an application programming interface (API) that can be accessed by the frontend to perform one or more functions and/or to present data in one or more formats. For example, the frontend may leverage the API to request tenant content (such as described above) from the backend so that the tenant content can be displayed to a user of the client device 100.

For simplicity of description, the embodiments that follow reference a configuration in which a backend and a frontend are configured to communicate and transact information according to a REST API, but it may be appreciated that this is merely one example and in other embodiments other signaling, communication, or data transaction methodologies may be used.

Returning to FIG. 1, in some embodiments the frontend may be a native application configured to execute over the processor(s) of the client device 100. In other cases, the frontend may be configured to operate with and/or in a web browser application. For simplicity of description, the embodiments that follow reference an implementation in which the client application is a browser configured to render the frontend of the documentation service within the browser. It may be appreciated, however, that this is merely one example and is not limiting.

As with many software services, the frontend of the documentation service shown in FIG. 1 is configured to render a graphical user interface for displaying information to a user of the client device 100. More specifically, in many embodiments, the client device 100 includes a display 102 that can be leveraged to render the graphical user interface 104.

The graphical user interface 104 can take any suitable form or shape defined by the frontend or the backend of the documentation service. For example, the graphical user interface 104 can include an address bar 106 into which an address 108 (such as a web address of the documentation system) can be provided as input. A user can interact with, and/or provide inputs to, the graphical user interface 104, such as by clicking or pressing the button 110.

In many embodiments, the graphical user interface 104 can include a content display region 112 in which at least one user-editable field may be rendered. As an example, a user-editable field 114 is shown, into which a user of the client device 110 may insert content, such as text content, multimedia content, and the like.

These foregoing described aspects of the client device 100 and, more broadly, the documentation service depicted in FIG. 1, are presented merely as example implementations and are not intended to be limiting. For example, it may be appreciated that a user interface of any software platform described herein can include any number of suitable user interface elements, arranged in any suitable manner. The user interface elements can depict content including text content, code content, multimedia content, linked content, graphical content, data content, tabular content, vector image content, and the like. The graphical user interface can be hierarchical or may be organized in any other manner.

More generally and broadly, as noted above, a frontend such as described herein of a software service, such as the documentation service of FIG. 1, may be configured to monitor user input to one or more user-editable fields, such as the user-editable field 114. In particular, the frontend may be configured to monitor user input to determine whether an opportunity for automation exists.

As with other embodiments described herein, once such a user input event is detected, a context object can be created by the frontend (or, in some embodiments, the backend).

Attributes of a context object can include, but are not limited to: an identifier of a software platform into which the user input was provided (here, the documentation service);

an identifier of a separate software platform referenced by the user input; an identifier of the user that provided the user input; a role of the user that provided the user input; a team to which the user that provided the user input belongs; how the user input was provided (e.g., pasted, typed, uploaded, and so on); a type of the user input (e.g., text content, a URL, multimedia content, and so on); and so on.

Once a context object is created describing, at least in part, the context in which a particular user input was received (and/or describing at least in part the user input itself), the context object can be used to query a database of automations, such as described above.

In particular, a context object defined after a user input event is received in the graphical user interface 104 can be compared to context object(s) or other context properties of previously executed and/or previously defined automations or automation templates. As a result of this construction, any existing automations stored in the automation database that are relevant to the user providing the user input (e.g., that have similar context) can be shown, such as in an overlay user interface element 118.

For example, a user of the frontend of the documentation service may paste a link 116 to content stored by another platform, separate from the documentation service. As with other embodiments described herein, the frontend (and/or the backend) can be configured to begin processing the user input (here, a URL) to determine whether an opportunity for suggesting automation to the user exists.

Specifically, in this example, the frontend may be configured to leverage one or more data detectors to determine that the user input provided by the user includes a URL. As one example, a data detector configured to recognize URL-formatted strings of content may be leveraged by the frontend. The URL data detector may be configured to receive as input a string of characters and may be configured to provide as output a value (e.g., a Boolean value) corresponding to a determination of whether the input provided to the data detector includes a URL.

As may be appreciated by a person of skill in the art, any suitable number of data detectors may be used, each of which may be purpose configured to detect presence or absence of any suitable or particular data or data types. Example detectable data can include, but is not limited to: URLs; data base IDs; platform names; product names; project names; document names; document parts; employee names; email addresses; phone numbers; physical addresses; stock symbols; and so on.

Once a data detector returns a positive indication that, as one example, a URL is present in the user input, the frontend (and/or backend) may determine what content or content type is at the URL's destination. In addition, the frontend (and/or backend) may determine what platform hosts the content linked by the URL inserted into the user-editable field 114 by the user.

Results of the above-described determinations (and/or others) can be each used to define a context object, such as described above.

For example, in one embodiment, the link 116 pasted by the user into the user-editable field 114 of the frontend of the documentation service may point to an issue report of an issue tracking system separate from the documentation system. In this example, the context object can memorialize and/or otherwise define in computer-readable code that this particular identified user (identified and authenticated by the documentation service), holding a particular role in the organization, pasted a URL pointing to a particular issue report of the issue tracking system, the particular issue report having a particular status when pasted, into a particular region of a particular document of the documentation system, and so on. It may be appreciated that additional context properties or descriptive values may be used in other embodiments.

As may be appreciated by a person of skill in the art, the above-described example context may be different for a different user having a different role in the organization who nevertheless also pastes a URL to an issue report into a document of the document tracking system. For example, it may be appreciated that software developers and marketing team members may paste URLs to issue reports into the document tracking system for different reasons. Similarly, project managers may paste URLs to issue reports for yet other reasons. As a result of these different contexts, more generally and broadly, it may be appreciated that different automations may be more relevant to different individuals.

Similarly, it may be appreciated that context can vary not only by individual and role but also based on platform(s). For example, a user pasting a link to a documentation service page into an issue report of an issue tracking system may have an entirely different context (and, thus may necessitate different automation suggestions) than a paste event in the reverse direction, namely an event in which that same user pastes an issue report link into a page of a documentation service.

Further still, it may be appreciated that context can vary based on the type of content inserted by a user into a user-editable field such as the user-editable field 114. For example, in some embodiments, a user may type a reference to another platform or an object or data item of another platform.

For example, a user may type (instead of pasting) into an issue report of an issue tracking system, "need to update project description for Project 123 in documentation system." In this example, the frontend of the issue tracking system may determine that a reference to the documentation system and, more specifically, a reference to a description page associated with Project 123 has been made by the user. In this example, no direct URL was pasted, but the system was nevertheless able to determine that the context of the input involved two separate platforms.

In yet further examples, it may be appreciated that context can also vary based on a property or metadata item of a linked or referenced object. For example, the context in which a user pastes a link to a "new" issue report into a document of the documentation service may be different than a context in which a user pastes a link to a "completed" or "closed" issue report into a document of the documentation system.

These foregoing examples are not exhaustive. More generally and broadly, it may be appreciated that a context, as described herein, that relates to and/or describes a particular user input event can be defined in any number of suitable ways and may be based, at least in part, on any number of suitable properties.

As noted above, a context object—regardless of how it is formatted or generated—may be compared against other context objects or, more particularly, compared against context objects associated with existing automations or automation templates. For example, as noted above, a first vectorized context object can be compared to a second vectorized context object to determine, as one example, a cosine similarity therebetween. If the similarity satisfies a particular threshold, the two contexts may be found to be equivalent.

This technique, and other equivalents thereof, of digitally representing a multiplatform user input context in order to search for, and obtain, contextually-relevant automations may be particularly useful in large organizations with well-developed workflows and organizational policies.

For example, once a user input is received, a context object is created, and at least one existing automation is determined to be associated with a context that is sufficiently similar to the context object, the graphical user interface 104 may be modified to present to the user an option to view recommended automation(s). As one example, an affordance 120 (which may be a button) can be rendered in the overlay user interface element 118. The affordance 120 may provide a visual indication to the user that at least one automation suggestion has been found.

From the perspective of the user, a system as described herein dramatically simplifies processes and operations associated with selecting relevant automations. For example, from the perspective of the user, the affordance 120 is automatically shown as soon as the user pastes the link 116 into the user-editable field 114. Examples of automations options that may be shown to the user when the user engages the affordance 120 are described in reference to FIGS. 2A-3G.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that, after a user input is provided in a given context that signals an opportunity for automation, as described above, any number of suitable user interfaces or user interface modifications can be presented to the user to allow the user to simply and easily select, modify, and/or define one or more automations as suggested.

Further, such user interfaces can also be used to present automation management options to a user, such as one or more options to disable existing automations that the user himself or herself has already enabled in other similar or identical contexts.

Figure 2A:
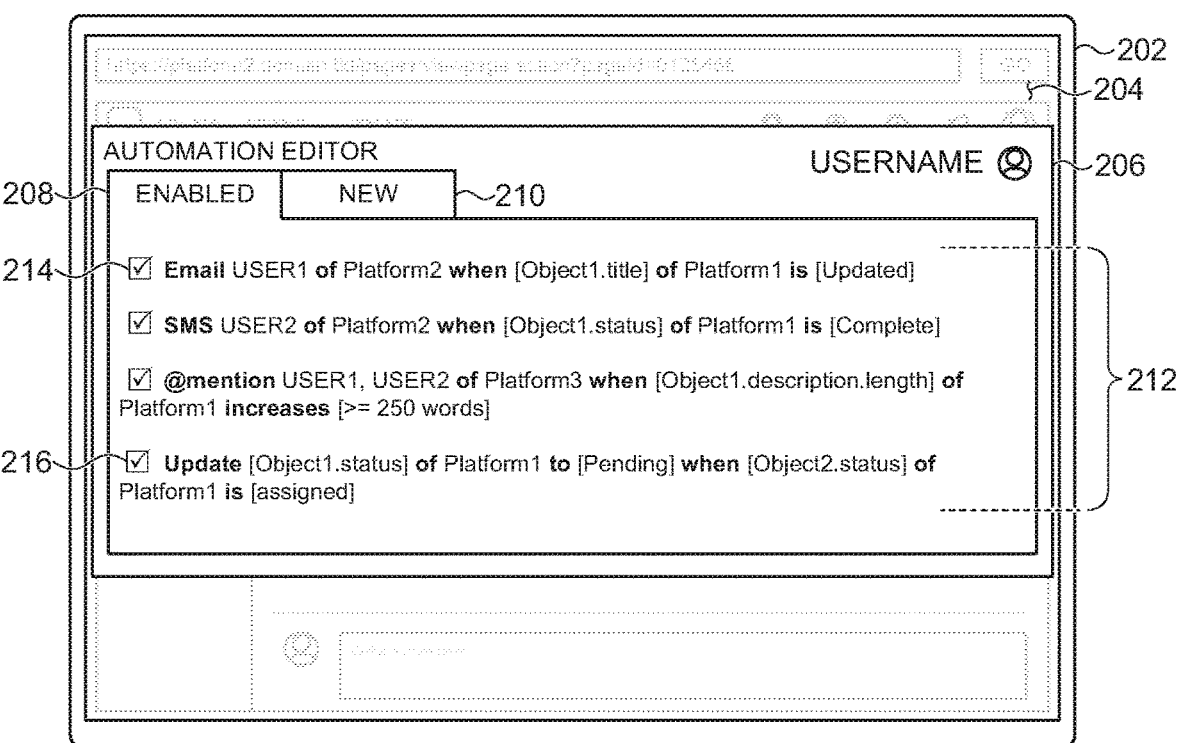
FIGS. 2A-2B each depict a modification to the graphical user interface of FIG. 1, presenting automatically-selected, context-specific, automation options to a user of the software platform.

FIG. 2A presents such a user interface. In particular, FIG. 2A depicts a client device 200 that, like the client device of FIG. 1, includes a display that may be leveraged by frontend software to render a graphical user interface 204. The client device 200 may be configured and/or operated in the same manner as described above with reference to FIG. 1; this description is not repeated.

In this example, the graphical user interface 204 includes an automation editor window 206 that, as illustrated, includes two selectable groupings of user interface elements depicted as tabs. A first tab 208, when selected by a user of the client device 200, can display options for a user to manage (e.g., enable, disable, or modify) existing automations that have been created or otherwise utilized by that user in similar contexts.

A second tab 210, described in greater detail with reference to FIG. 2B, can display options for a user to enable and/or schedule one or more new automations.

More specifically, the first tab 208 can include a region 212 that itemizes for the user automations that the user has previously enabled. In the illustrated embodiment, four example automations are presented, each of which is a cross-platform automation that includes at least one trigger or condition associated with a first platform and at least one action associated with a second platform.

As one example, the automation 214 is triggered by a change in the title of Object1 of Platform1. In response to this event occurring, an email is authored to User1 of Platform2. The automation 216 is triggered by a status of Object2 in Platform1 being changed to "Assigned." In response to this condition being met, a status of Object1 in Platform1 is changed to "Pending."

It may be appreciated that these example automations are not exhaustive of the different automations that may be performed by one or more platforms as described herein. To the contrary, each example automation depicted in FIG. 2A are presented merely as examples of possible automations that involve multiple platforms of a multiplatform system as described herein.

As noted above, in addition to providing a mechanism for a user to manage existing automations, a system as described herein may also provide an interface for both suggesting activation of existing automations (based on context, as described above) to the user and for providing a no-code or low-code interface for creating a new automation from scratch or from a template.

Figure 2B:
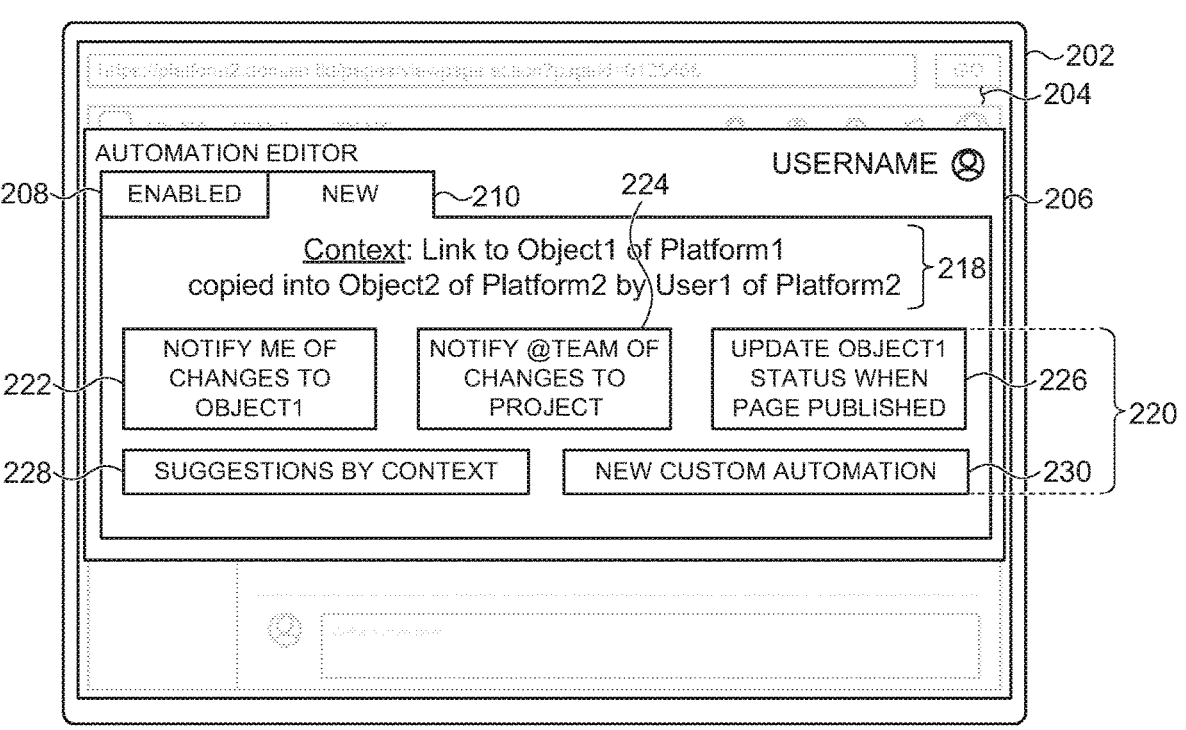

For example, FIG. 2B depicts an example user interface that may be shown when the second tab 210 is selected. In this example, a context 218 (which may not be expressly shown in all embodiments) may be used as described above to select one or more automations from an automation database that may be contextually relevant to a user that provided an input to a user-editable field rendered in the graphical user interface 204 of the client device 200.

In particular automations, based at least in part on the context 218, a set of automation options 220 may be shown. The set of automation options may include automatically-selected automations 222, 224, 226, and may also include further options, such as the affordances 228 and 230, each of which may provide additional more specific contextual options to the user.

As with FIG. 2A, it may be appreciated that the example selected automations are not exhaustive of the different automations that may be performed by one or more platforms as described herein. To the contrary, each example automation depicted in FIG. 2B is presented merely as an example of a possible automation that can involve multiple platforms of a multiplatform system as described herein.

These foregoing embodiments depicted in FIGS. 2A-2B and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that the contextually-suggested automation options shown in FIG. 2B may not be desired by the user in all circumstances, despite that the context of the user input is substantially similar to the context(s) of the suggested automations.

For example, in some cases, a user may desire to create a new automation, view a list of automations suggested by system administrators or other team members, view a list of popular (e.g., used by many users, within the organization or elsewhere regardless of or based on role) automations separate from (or based on) the context of the user's input, and so on. FIGS. 3A-3G provide example user interfaces presenting such operations.

Figure 3A:
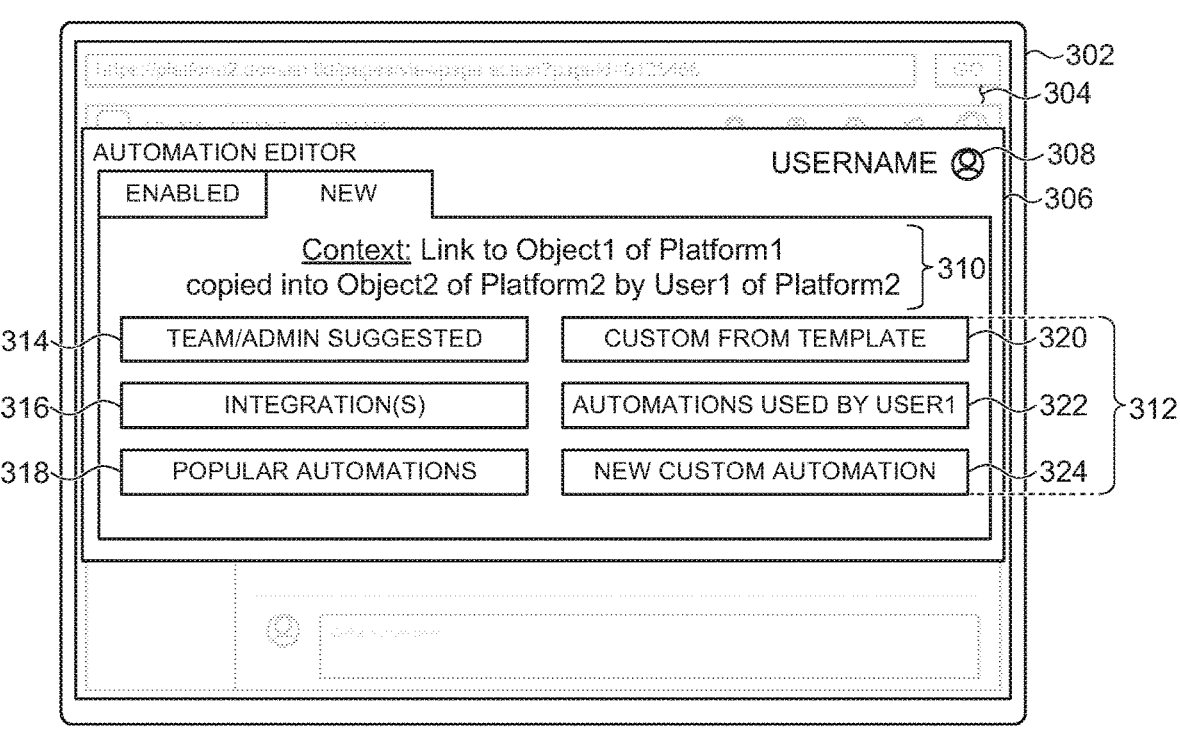
FIGS. 3A-3G each depict a respective modification to the graphical user interface of FIGS. 1 and 2A-2B, each presenting different automation options to the user of the software platform.

In particular FIG. 3A depicts a client device 300 including a display 302 that can be used by a frontend of a particular software platform (e.g., a documentation service) to render a graphical user interface 304. As with the embodiments described with reference to FIGS. 2A-2B, the client device 200 can be configured in the same manner as described above with reference to FIG. 1; this description is not repeated.

The graphical user interface 304 as shown in FIG. 3A may be shown in response to a user pressing and/or interacting with the affordance 228 shown in FIG. 2B, although this is not required of all embodiments.

The graphical user interface 304 depicts an automation editor window 306 that may be customized for a particular user 308. In some examples, as with the embodiment shown in FIG. 2B, a context 310 may be optionally shown in the automation editor window 306. As with other embodiments described herein, the context 310 may inform how the automation editor window 306 is rendered, what options are presented to the user 308, and/or what automations are suggested to the user 308.

In this example, multiple affordances may be shown (in an option area 312), each of which may present the user with different options for defining new automations, enabling suggested automations, and the like.

The option area 312 of the automation editor window 306 can include an affordance 314 that presents the user 308 with one or more automation options based on context clues specifically related to the user's team or an administrator. (see, e.g., FIG. 3B). These automations may be manually created by team leaders or administrators and may only vary between users of different teams; in other words, the context that informs what automations are shown to the user when the user engages with the affordance 314 depends only (or substantially) on the users team. More simply, different teams of users may be presented different options for automation when engaging the affordance 314.

The option area 312 of the automation editor window 306 can also include an affordance 316 that presents the user 308 with one or more automation options based integrations that are available to the user based on the user's role and/or permissions or based on what platforms the user's input invokes. (see, e.g., FIG. 3C). As with other examples presented herein, these automations may be manually created by integration maintainers or these automations may be features of the integrations themselves; in other words, the context that informs what integrations are available to install or utilize or automate are shown to the user when the user engages with the affordance 316 depends only (or substantially) on the platforms invoked by the user's input. More simply, the affordance 316 can assist the user 308 with determining whether an integration between particular software platforms exists, and whether those integrations may be of use to the user based on the user's input and the context thereof.

The option area 312 of the automation editor window 306 can also include an affordance 318 that presents the user 308 with one or more automation options based on relative popularity—given similar context—within an organization or across multiple tenants. (see, e.g., FIG. 3D). More simply, users may be presented common or popular options for automation when engaging the affordance 318. In some cases, although not required, the automations associated with the affordance 318 may have a different threshold similarity with the context 310 than the automation options shown and described in reference to FIG. 2B.

Figure 3B:
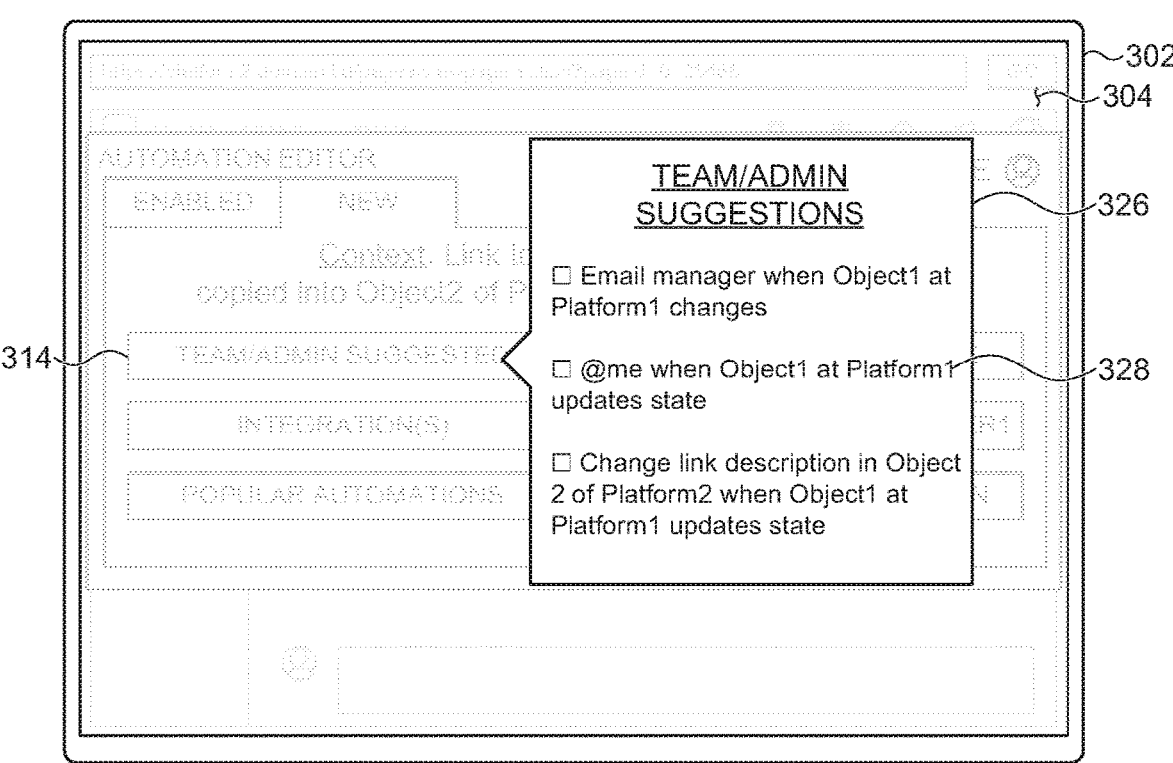
Figure 3C:
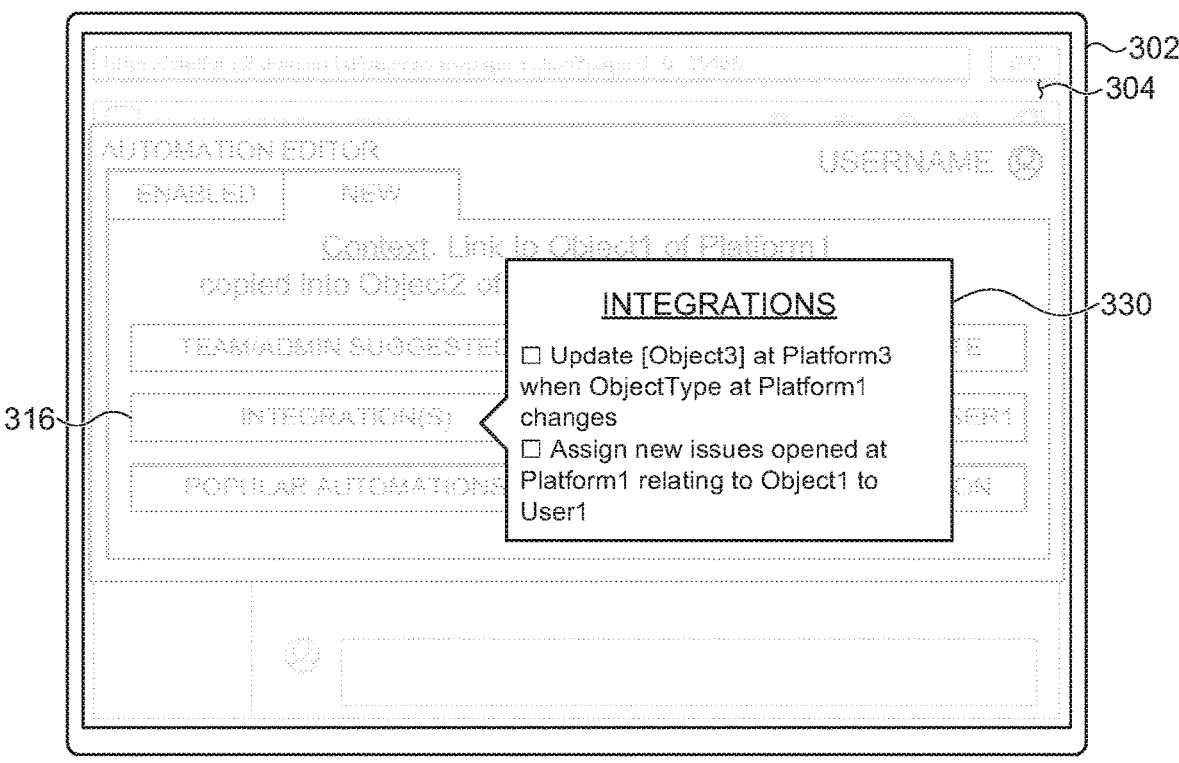
Figure 3D:
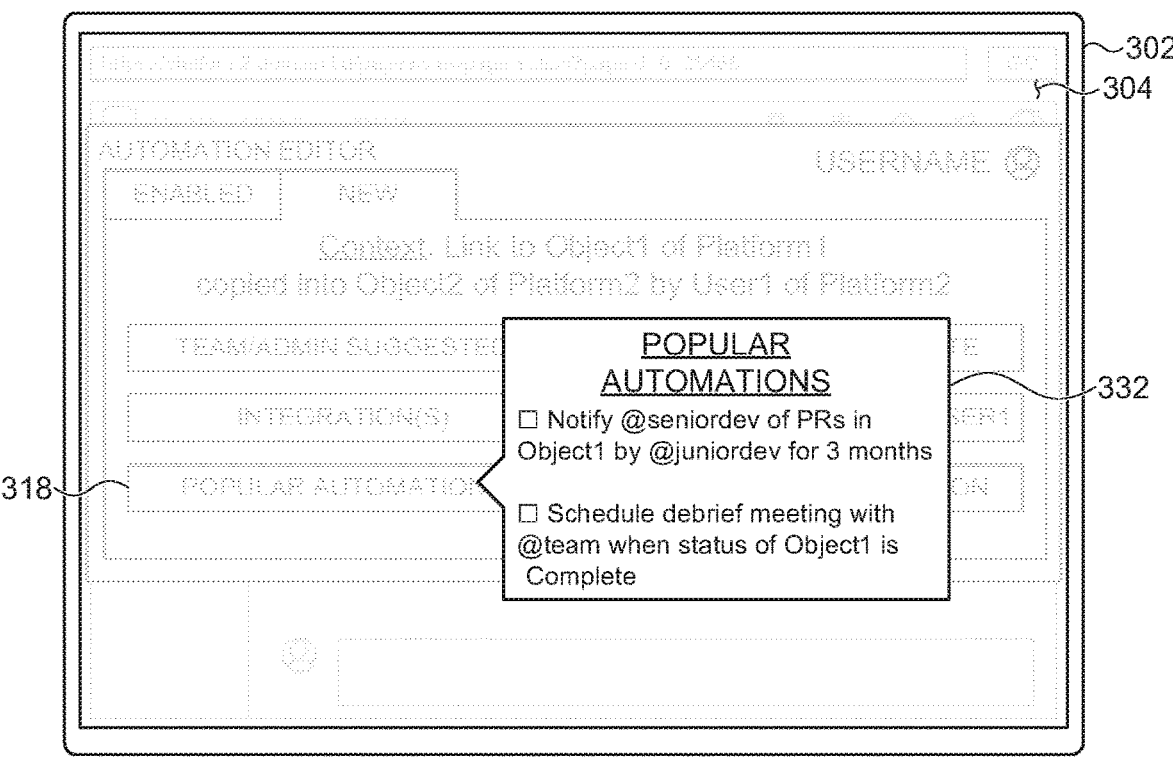
Figure 3E:
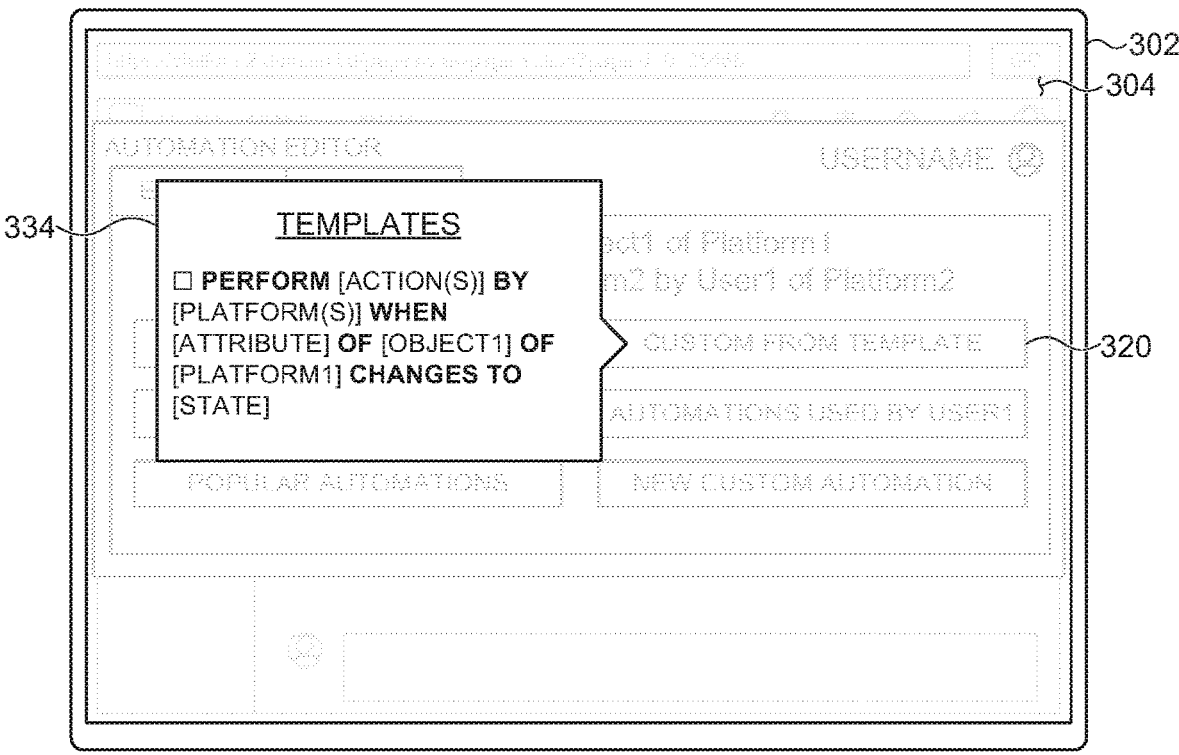

The option area 312 of the automation editor window 306 can also include an affordance 320 that presents the user 308 with one or more automation templates which may be defined by an organization, defined by a third party or other users (e.g., via a template marketplace or sharing platform) (see, e.g., FIG. 3E). More simply, users may be presented templates for automation, when engaging the affordance 320, that the user can populate with specific triggers, specific conditions, and/or specific actions—some of which may be associated with one platform, some of which may be associated with another platform. For example, an action performed by a first platform may be triggered by an event that occurs in a second platform. In an extended example, an action in a first platform can be performed only in response to a condition being met in a second platform and a condition being met in a third platform. It may be appreciated that templatization of automations can be extended and/or used in a number of suitable ways.

Figure 3F:
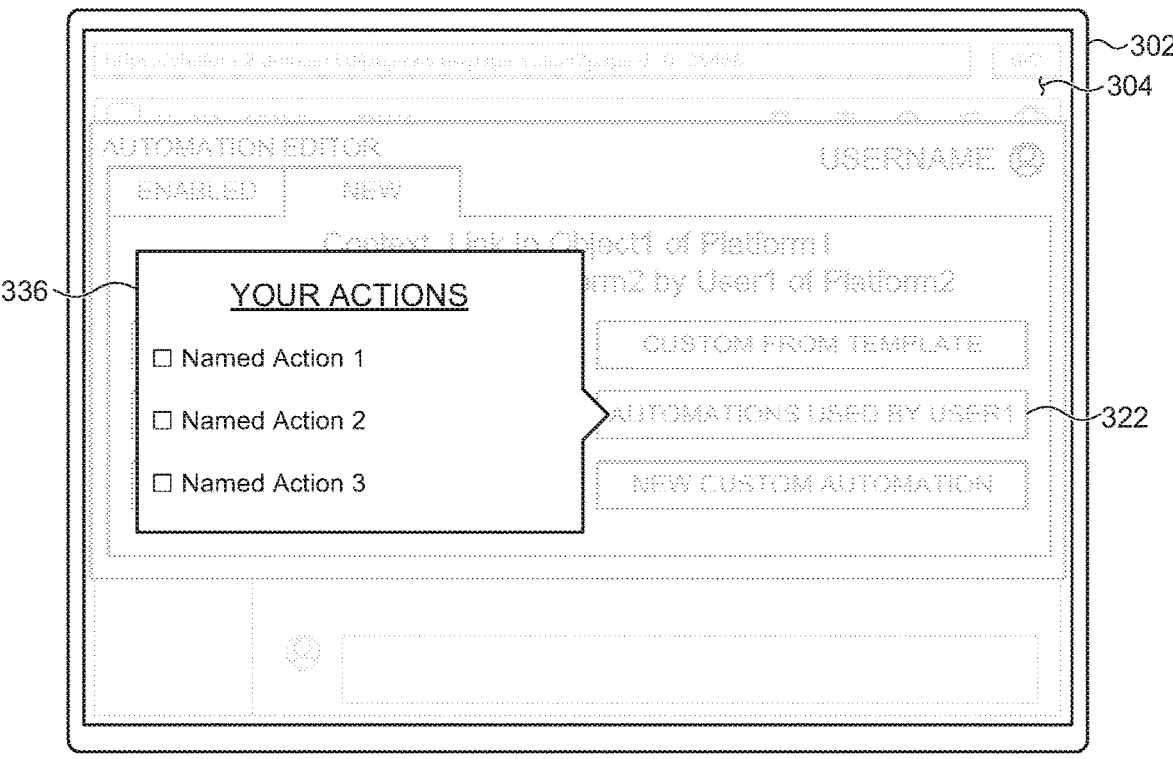

The option area 312 of the automation editor window 306 can also include an affordance 322 that presents the user 308 with one or more automations that the same user has used in other, less related or unrelated contexts (see, e.g., FIG. 3F). More simply, users may be presented with automations that the user has applied in other contexts.

Figure 3G:
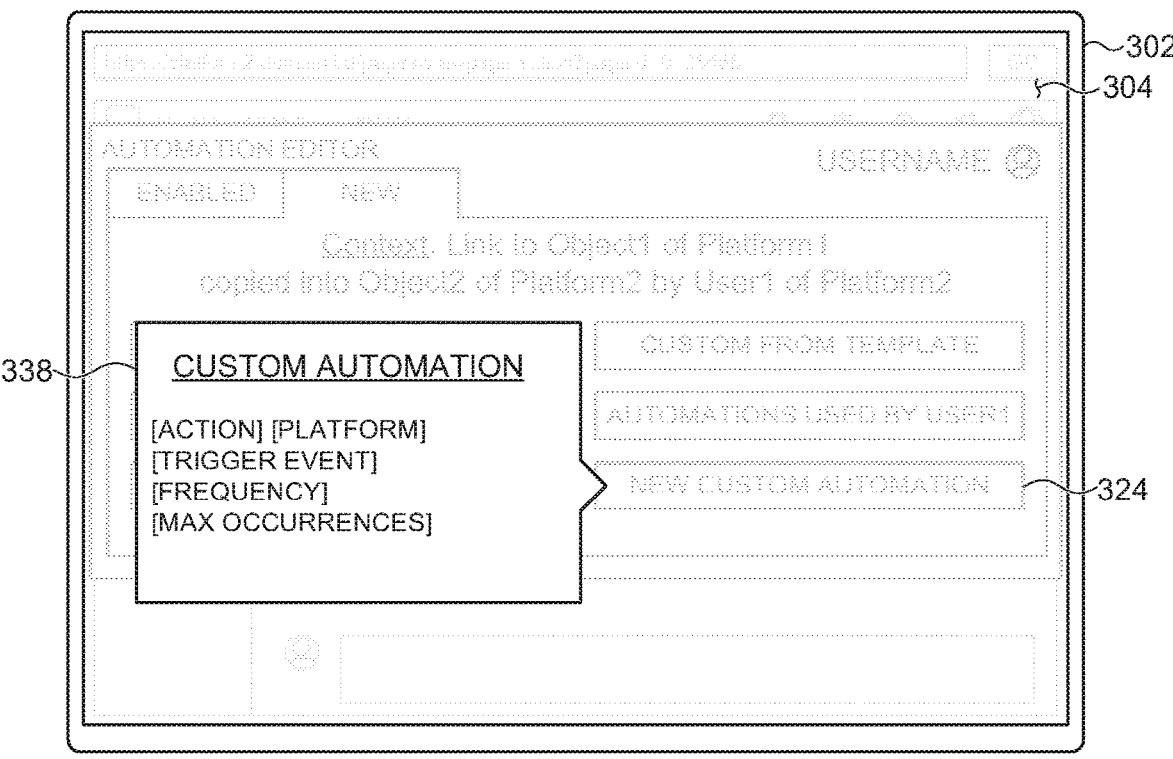

The option area 312 of the automation editor window 306 can also include an affordance 324 that presents the user 308 with an interface to define a custom automation from scratch (see, e.g., FIG. 3G).

These foregoing embodiments depicted in FIG. 3A and the various alternatives thereof and variations thereto are presented, generally, for purposes of explanation, and to facilitate an understanding of various configurations and constructions of a system and a graphical user interface, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, as noted above, selecting one or more affordances rendered in the example graphical user interface of FIG. 3A may present the user with one or more additional options.

For example, FIG. 3B depicts an example popover user interface 326 that may be shown in response to selection or engagement with the affordance 314. The popover user interface 326 may present one or more automation options automatically selected based on context and based on a team to which the user that provided the input belongs. An example automation 328 is provided as an option for the user of the client device 300 to enable or otherwise activate.

As with other embodiments described herein, it may be appreciated that these example automations shown in FIG. 3B are not exhaustive of the different automations that may be relevant to a team of a particular user. To the contrary, each example automation depicted in the figure is presented merely as an example of a possible team-selected automation that involves multiple platforms of a multiplatform system, such as described herein.

As noted above, FIG. 3C depicts an example popover user interface 330 that may be shown in response to selection or engagement with the affordance 316. The popover user interface 330 may present one or more automation options based on and/or leveraging one or more integrations that may be installed to facilitate communications between two or more platforms. As with other embodiments described herein, it may be appreciated that these example automations shown in FIG. 3C are not exhaustive of the different automations that may be useable with and/or enabled by a particular integration or chain or set of integrations. To the contrary, each example automation depicted in the figure is presented merely as an example of a possible integration-enabled automation that involves multiple platforms of a multiplatform system, such as described herein.

Further, also as noted above, FIG. 3D depicts an example popover user interface 332 that may be shown in response to selection or engagement with the affordance 318. The popover user interface 332 may present one or more automation options based on historical use statistics across an organization, through all roles of an organization, or based on some other population-defining parameter. In some cases, automations selected based on popularity may be required to have at least a threshold number of users enabling that automation; frequently-disabled automations may not be shown or may be deemphasized in the graphical user interface 304.

As with other embodiments described herein, it may be appreciated that these example automations shown in FIG. 3D are not exhaustive of the different automations that may be defined to be common or popular in a particular given population based on usage statistics. To the contrary, each example automation depicted in the figure is presented merely as an example of a possible automation that involves multiple platforms of a multiplatform system, such as described herein.

FIG. 3E depicts an example popover user interface 334 that may be shown in response to selection or engagement with the affordance 320. The popover user interface 334 may present one or more automation templates that may be contextually relevant to the user. As noted above, templates can include one or more selectable fields that may be engaged by the user to select one or more triggers, one or more conditions, and/or one or more actions to perform in one or more platforms in a multiplatform system. As with other embodiments described herein, it may be appreciated that these example template automations shown in FIG. 3E are not exhaustive of the different automation templates that may be shown to a user in a system such as described herein; for example, as noted above, in some cases, templates may be selected from a marketplace or directory of templates. Some templates may be monetized, others may be shown to users as an advertisement.

FIG. 3F depicts an example popover user interface 336 that may be shown in response to selection or engagement with the affordance 322. The popover user interface 336 may present one or more automations used by the same user in a different context. In some cases, automations selected based on different context may be sorted or ordered by similarity to the current context of the user input.

FIG. 3G depicts an example popover user interface 338 that may be shown in response to selection or engagement with the affordance 324. The popover user interface 338 may present, as noted above, an interface through which the user can select one or more triggers, one or more conditions, one or more actions in one or more platforms, and so on. In some cases, a custom automation may also be set up to trigger only a threshold number of times before being automatically disabled. In other cases, an automation may be set to automatically trigger at a particular interval.

These foregoing embodiments depicted in FIGS. 3A-3G and the various alternatives thereof and variations thereto are presented, generally, for purposes of explanation, and to facilitate an understanding of various configurations and constructions of a system and a graphical user interface, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4B:
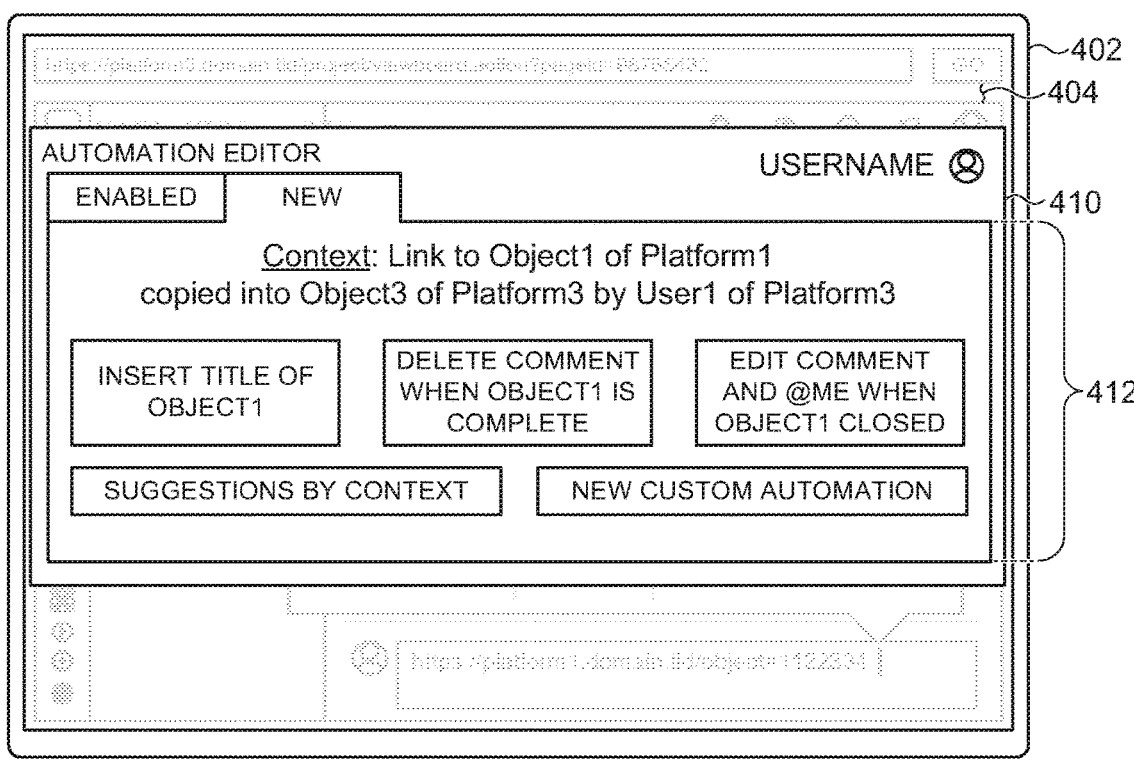
FIG. 4B depicts a modification to the graphical user interface of FIG. 4A, presenting a set of automatically-selected, context-specific, automation options to a user of the software platform of FIG. 4A.

For example, it may be appreciated that the documentation system described in reference to FIGS. 1-3G is merely one example platform that may present contextually-relevant automation suggestions to a user of that platform. For example, FIG. 4A depicts an example user interface associated with a different platform type. In particular, FIG. 4A depicts a client device 400 that, similar to the client device 100 of FIG. 1, includes a display 402 that may be leveraged by a frontend of a project management service to generate a graphical user interface 404 that can include one or more user-editable fields into which a user input may be provided, such as described above. An example user-editable field is shown in the comment region 406. In this example, similar to the example graphical user interface shown and described in reference to FIG. 1, a user of the client device 400 may paste a link to an object of another platform which, in turn, can cause automatic display of an overlay user interface element 408 that, when engaged by a user, can cause an automation editor window 410 above (see, e.g., FIG. 4B) to be displayed which in turn can present to the user one or more automations and affordances 412, such as described here.

These foregoing embodiments depicted in FIGS. 4A-4B and the various alternatives thereof and variations thereto are presented, generally, for purposes of explanation, and to facilitate an understanding of various configurations and constructions of a system and a graphical user interface, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, generally and broadly, it may be appreciated that a system as described herein monitors for user input that may be provided to a frontend of a software platform, analyzes that user input to determine a context based on that input, and based on the determined context selects one or more automations that exhibit a related or similar context to automatically show in the graphical user interface of the same frontend into which the user provided the original input.

Figure 4C:
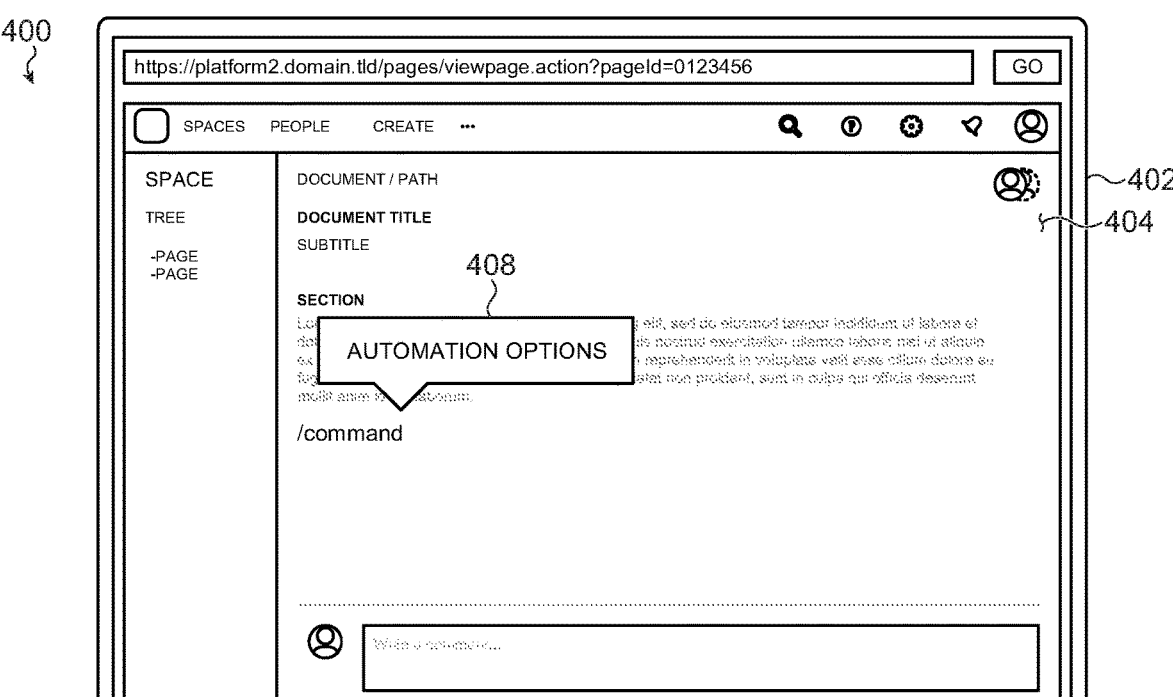
FIGS. 4C-4E each depict an example graphical user interface presenting contextually-relevant automation options to a user of a software platform, such as described herein.

The user input can be provided by typing, pressing, clicking, voice command, or any other suitable user-directed command or signaling that can be received by a frontend of a software platform. For example, as shown in FIG. 4C, in some embodiments, a client device 400 with a display 402 can render a graphical user interface 404 that triggers an overlay user interface element 408, such as described above, in response to a particular command or syntax provided by a user typing an input to the graphical user interface. Any suitable trigger phrases or syntax may be used to trigger a graphical user interface presenting automation options that are contextually relevant, such as described herein.

Figure 4D:
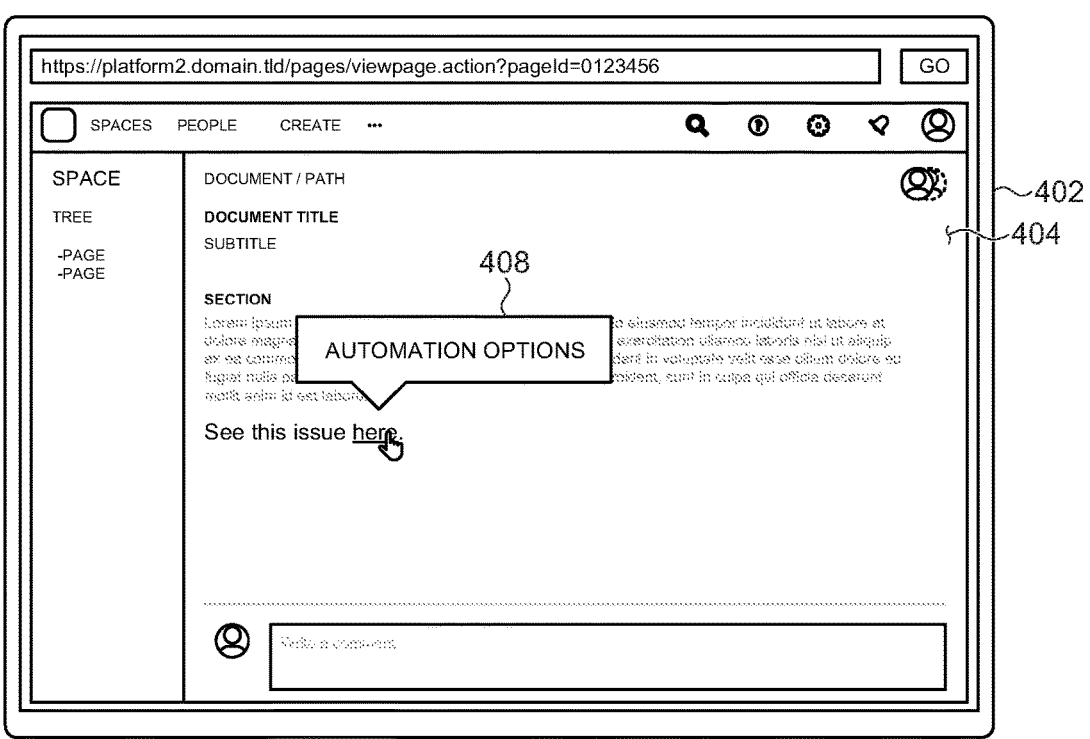

In other cases, such as shown in FIG. 4D, a client device 400 with a display 402 can render a graphical user interface 404 for a user interacting with an existing page. This in contrast with other embodiments described herein in which a user provides content or input that creates a page or other content item in a software platform, the embodiment shown in FIG. 4D highlights that content consumers can also be presented with automation options as described herein. The automation options presented to a content consumer (as opposed to a content producer) can be the same or may be different as those presented to a content producer, such as described above. For example, automation options presented to a content consumer may be based, contextually, on how long content has existed (whether the content being consumed is new or old), how often that content is accessed or changed by a person having a similar role in an organization as the content consumer accessing the page, and so on. More broadly, a context object associated with a content consumer may be different in some examples than that of a content producer which in turn can cause to be presented to the content consumer a different set of automations, automation options, automation templates, automation suggestions, and so on.

Figure 4E:
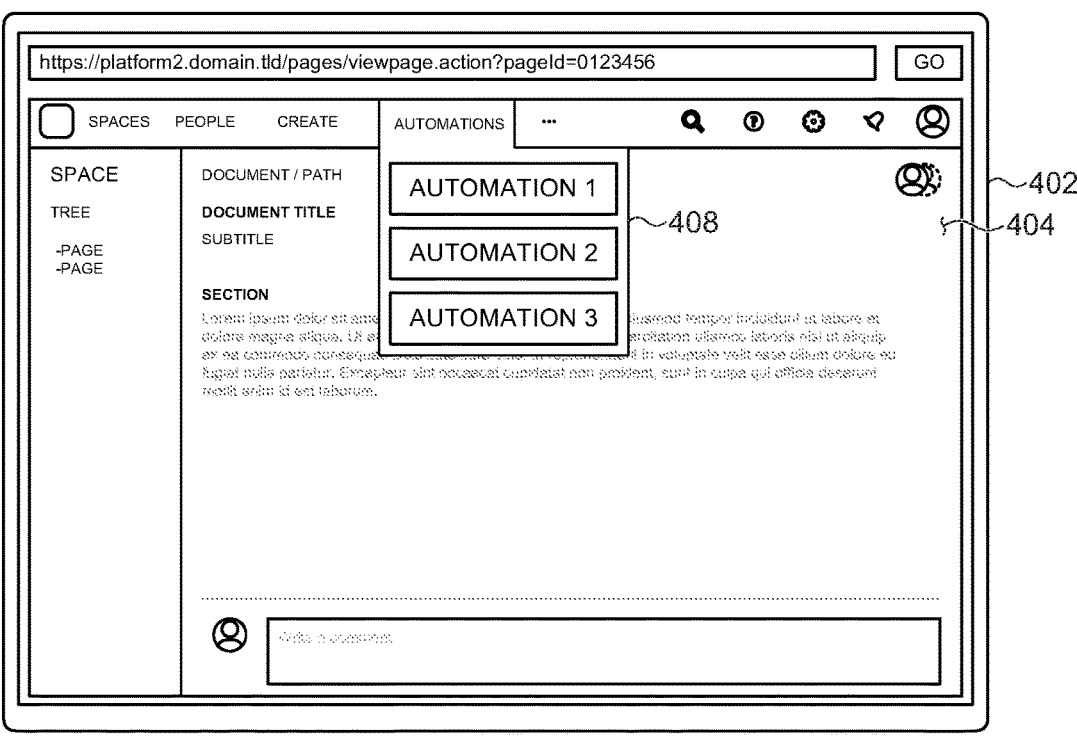

In other examples, user input or user interaction may not be text or link based, such as shown in certain preceding embodiments. For example, as shown in FIG. 4E, a graphical user interface element such as a button, tab, or clickable element or affordance can be configured to presented one or more automation options to a content consumer or a content producer such as described herein.

In yet further examples, context and/or automation presented to a user may be based at least in part on one or more context objects, some of which may be abstracted to different levels. More particularly, in some cases, a context object may be based primarily or partially on which platforms a user is interacting with (e.g., context relevant automations/suggestions are selected based on platform-level context). In other cases, a context object may be based primarily or partially on which object types a user is interacting with (e.g., context-relevant automations/suggestions are based on object type-level context). In yet other cases, a context object may be based primarily or partially on which specific objects a user is interacting with (e.g., context-relevant automations/suggestions are based on particular objects). In yet other cases, a context object may be based primarily or partially on particular attributes of particular objects with which a user is interacting.

In these examples, a user may be presented with an option to select which abstraction of context best describes the user's preferred automations. For example, the user may be presented with an option to select an appropriate context prior to being shown one or more automations selected based on that context. In these examples, the user's automations may vary based on the level of abstraction selected by the user.

In yet other examples, a user may be presented with multiple automation options alongside a context (selected from a set of context objects) that was used to identify the automation. For example, a parenthetical statement may be appended to an automation describing the detected context through which the presented automation was found/selected. As one example, a user pasting a link to a service desk ticket into a documentation service document may be presented with the following automation options: for every service ticket opened, send a message to @me (this is a popular automation for managers who regularly SERVICE DESK tickets into DOCUMENTATION SYSTEM); for every update to this ticket, add a summary line to this page (you have added this automation after pasting tickets in other pages); for every change to the imports in this project, add a unit test ticket to PROJECT (unit tests tickets are required by MANAGER to be opened any time imports changes); and so on.

Still further it may be appreciated that as data and automations are passed between different platforms, certain automation options may be hidden from a user's view or otherwise not presented if that user does not have appropriate permissions at each involved platform. In other cases, permissions may be ignored—the automation platform may be a superuser of each platform to perform automations regardless of whether a scheduling user has permissions to perform those automations. This may be particularly helpful for junior employees to automate actions for the benefit of more senior employees (e.g., managers or executives).

As a result of this architecture, a user interacting with any platform in a multiplatform system can be presented with readily-accessible options for automation of even menial or otherwise small tasks. The user is not required to change context, change UI view, or to have any pre-existing knowledge about what automations may be available, how to create automations, and so on.

In this manner, automation of tasks may be directly encouraged of all users. As the automation system matures, and more and more users leverage automation to expedite various multiplatform workflows, the database of existing and historical automations customized by users may become progressively more helpful in predicting what automations are useful to what users in particular contexts.

Further, in some embodiments, individual automation properties may be suggested based on context or common usage. For example, in one embodiment, a user may provide an input (e.g., by pasting a link to a second platform in a first platform) that defines a particular context. Based on this context, the system may automatically suggest a particular automation trigger, without necessarily specifying or suggesting what actions should be performed in response to that trigger. Similarly, based on the determined context of the user input, the system may automatically suggest a particular condition, without necessarily specifying or suggesting what actions or other triggers or conditions should form a portion of a complete automation object.

These foregoing examples are not exhaustive; it may be appreciated that any suitable portion of an automation or automation part suggestion (or frequency, or maximum occurrences, and so on) may be informed by context, as described herein.

Similarly, it may be appreciated that the process of executing automations may vary form embodiment to embodiment. In some examples, after a user selects a particular automation to be enabled, a signal may be sent to a relevant platform to instruct that platform to perform the actions associated with the selected automation in response to the selected trigger or condition.

In other examples, an event drive architecture may be leveraged to perform one or more automation actions in response to one or more automation triggers.

Figure 5:
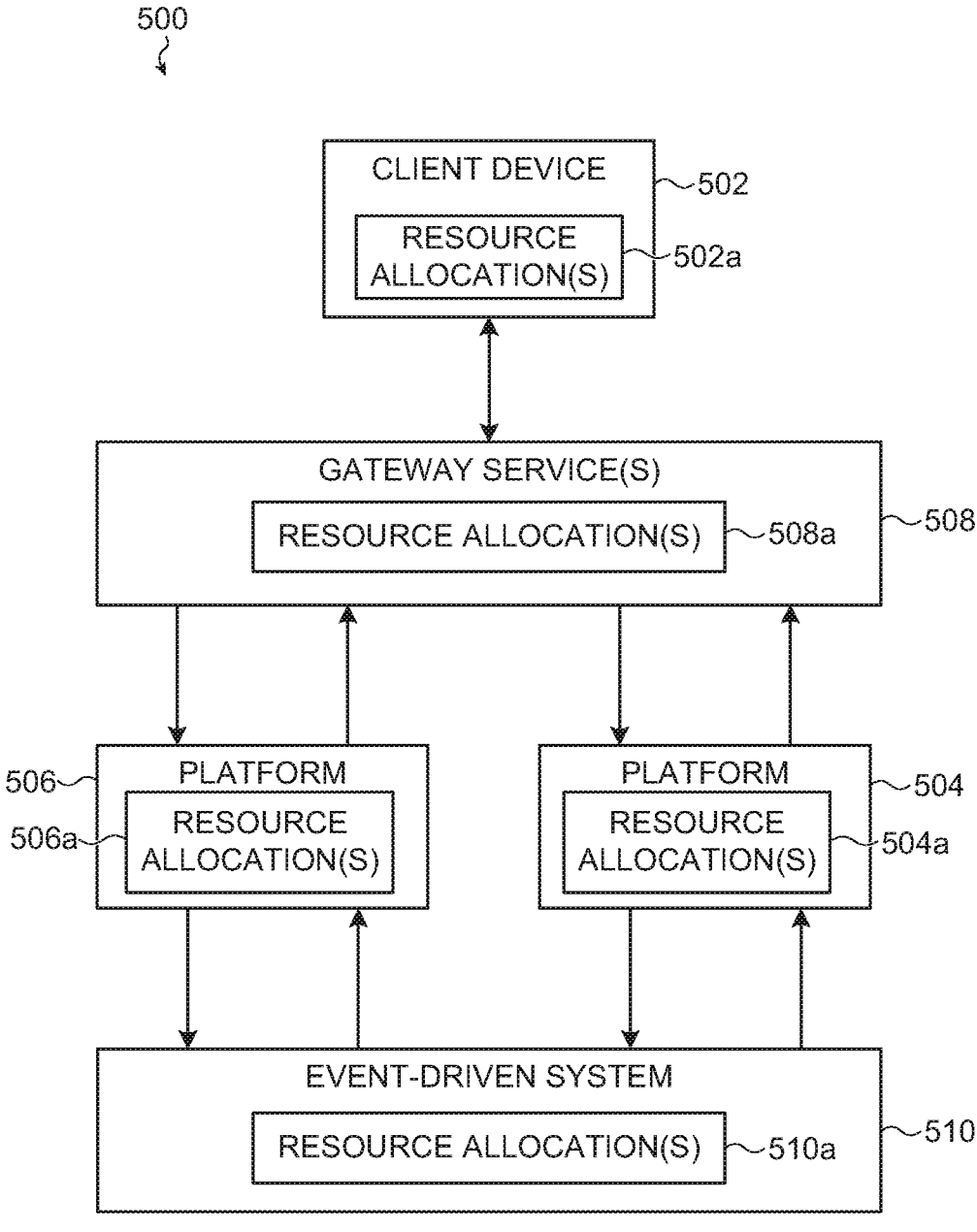
FIG. 5 depicts a system diagram of a multiplatform system as described herein.

FIG. 5 depicts a system diagram of a multiplatform system implemented with an event-driven automation system, as described herein. The system 500 includes a client device 502 configured to communicate with one or more platforms, such as the platform 504 or the platform 506. In other words, the client device 502 may be configured to execute a frontend of either or both the platforms 504, 506, while each of the respective platforms 504, 506 are purpose configured to execute a respective instance of each respective backend.

In some constructions, although not required of all embodiments, a gateway service 508 may interpose the client device 502 and the platforms 504, 506. In some examples, the gateway service 508 may be configured to structure API calls by and between the client device 502 and the platforms 504, 506. In some embodiments, a gateway service may not be required.

The system 500 can also include an event-driven system 510. The event-driven system 510 may be configured to receive as input one or more events (e.g., state changes, data changes, and so on) from each of the platforms 504, 506. Similarly, the event driven system 510 can be configured to receive automation objects from either the client device 502 or either of the platforms 504, 506. In each of these examples, automation objects may be considered events that are scheduled to be executed in response to associated triggers or conditions or states tracked by the event-driven system 510. In this manner, the event-driven system 510 serves as a centralized cross-platform automation manager.

As with other embodiments described herein, the various elements of the system 500 can be implemented as physical or virtual hardware (e.g., represented as the resource allocations 502a-510a). Many configurations are possible.

For example, the event-driven system 510 may be implemented in a number of ways. One example is provided in FIG. 6.

Figure 6:
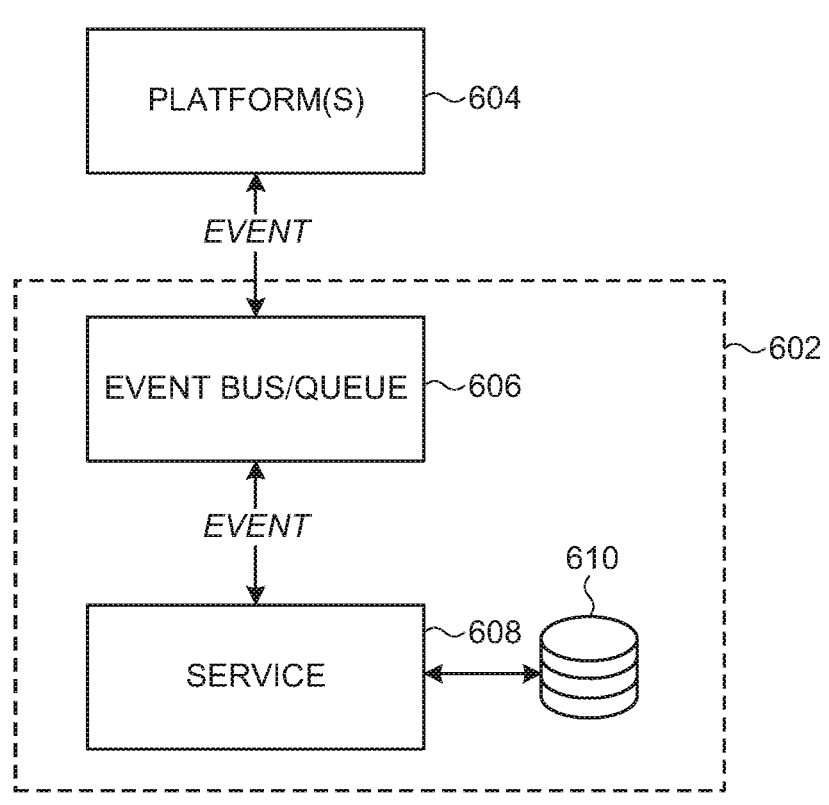
FIG. 6 depicts a system diagram of a multiplatform system, as described herein, that can leverage an event-driven architecture for cross-platform event scheduling.

FIG. 6 shows an automation system 600 including an event-driven system 602 communicably coupled to a platform backend 604. The event-driven system 602 includes an event bus 606 (also referred to as an event dispatch, an event queue, a message queue, or any other suitable similar phrase). The event bus 606 is configured to asynchronously receive and store discrete data items referred to as "events" formatted according to a specification or protocol unique to the system and/or conforming with a specified messaging protocol.

In this example, the event bus 606 can receive events (such as trigger events, state change events, or automation objects corresponding to automations enabled by or customized by a user) from the platform backend 604 and store those events in a queue based on a time stamp or indexed order in which each event was received and/or added to the event bus 606. Thereafter, events stored by the event bus 606 can be consumed by one or more services, servers, microservices, functions, lambda functions, and so on in order to service or execute one or more automations of one or more actions of the platform backend 604.

Collectively, these example event-consuming elements are depicted in FIG. 6 as the service 608. The service 608 can receive and/or consume events and/or be notified of new events from the event bus 606 in any suitable manner. Examples include, but are not limited to: registering the service 608 as a callback executed by the event bus 606 once an event of a given type is received; registering the service 608 as a subscriber of a particular message type generated by the event bus 606 in response to the event bus 606 receiving an event of a particular type or an event that changes a particular state; registering the event bus 606 as a subscriber of one or more announcements of state changes or events periodically generated or broadcast by the event bus 606; and so on. In some embodiments, the service 608 can include or can be coupled to a state database 610 that locally stores partial or complete state information or event information, at least partially mirroring information contained/stored by the event bus 606.

It may be appreciated that the foregoing example architecture described in reference to FIGS. 5-6 is merely one example architecture of a system as described herein. In other cases, an event-driven architecture may not be required or preferred.

FIG. 7 is a flowchart depicting example operations of a method of selecting automations to present to a user of a multiplatform system, such as described herein. The method 700 includes operation 702 at which a user input is received to an editable field at a client interface, also referred to as a frontend. At operation 704, the user input may be parsed and/or otherwise analyzed to determine whether that input includes content that identifies data stored by a separate platform. Next, at operation 706, the client interface/frontend may be updated to show a set of selectable actions and/or a set of selectable triggers. Each set displayed for the user may be selected at least in part based on a determined context, such as described above. Next, at operation 708, a selection by the user of at least one selectable action and at least one selectable triggers is received. Finally at operation 710, an automation object can be created based on the selection(s) received at operation 708 and a new automation can be defined and enabled.

Figure 8:
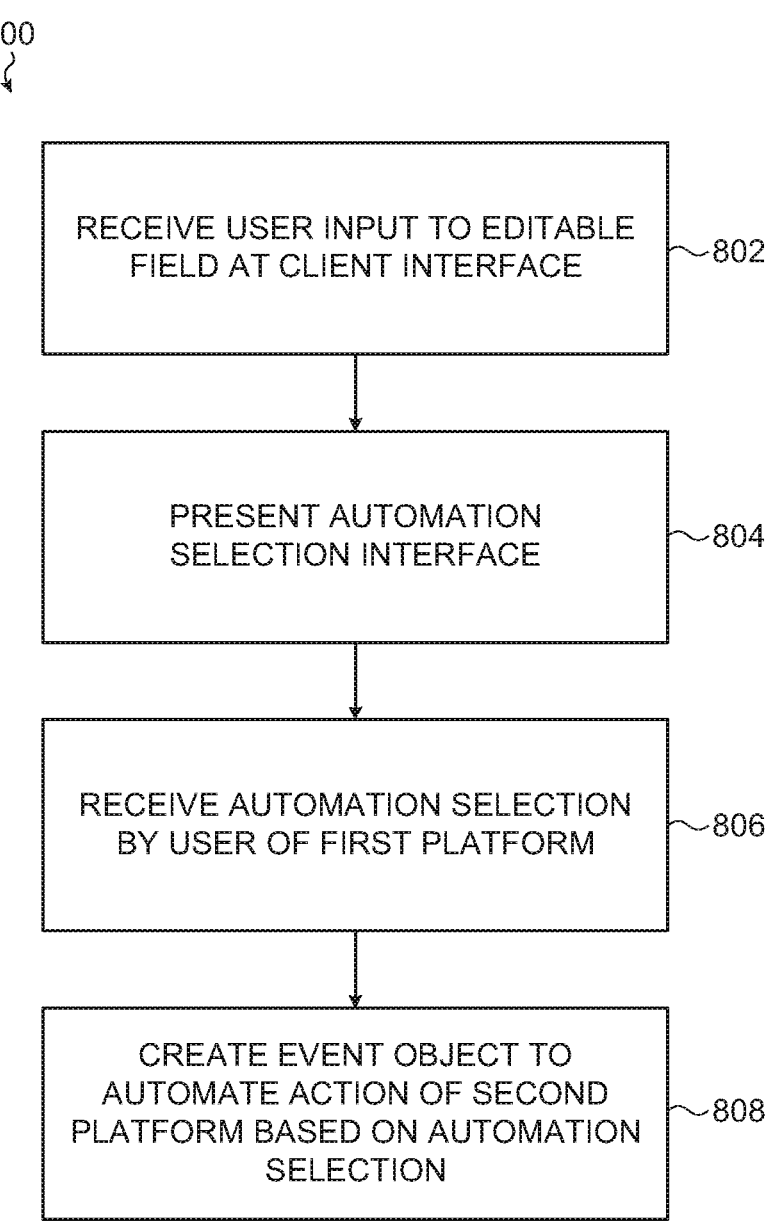
FIG. 8 is a flowchart depicting example operations of a method of defining one or more automation events based on a user input provided in a multiplatform system, such as described herein.

FIG. 8 is a flowchart depicting example operations of a method of defining one or more automation events based on a user input provided in a multiplatform system, such as described herein. The method 800 includes operation 802 in which a user input to an editable field is received at a client interface, also referred to as a frontend. Next, at operation 804, an automation selection interface (see, e.g., FIGS. 2A-3G) may be presented to the user. In many cases, at least one automation presented in the interface may be selected based on a similarity of context between a determined context of the input received at operation 802 and a context of that selected automation. Next at operation 806, an automation selection by the user is received and, finally, at operation 808, the selected automation may be used to create an event object which in turn may be provided as input to an event-driven automation system, such as described above in reference to FIGS. 5-6.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that, although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As described herein, the terms "processor" and "processor allocation" may be used to refer to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

In addition, as described herein, the terms "memory" and "memory allocation" may be used to refer to any software and/or hardware-implemented data storage device or circuit physically and/or structurally configured to store or otherwise hold in digital memory one or more classes or objects or data. This term is meant to encompass virtual memory, swap memory, random access memory, magnetic media, optical media, flash memory, solid state memory, and the like.

What is claimed is:

1. A method of scheduling automation of a first software platform from a second software platform, the method comprising:

receiving, at a client interface of the second software platform, a user input to an editable field rendered in the client interface;

parsing, by the second software platform, the user input to determine that the user input comprises content identifying a first data object of the first software platform;

identifying a second data object of the second data platform associated with the client interface;

defining an input context based on the first data object and the second data object;

presenting, by the client interface of the second software platform, an interface element displaying a selectable automation based at least in part on the content and referencing an action to be performed by the first software platform in response to a trigger event, the selectable automation selected based at least in part on the input context; and receiving at the client interface of the second software platform a selection of the selectable automation; and enabling by the second software platform the automation in the first software platform to cause the first software platform to perform the action in response to occurrence of the trigger event.

2. The method of claim 1, wherein the content comprises an address pointing to the first data object of the first software platform.

3. The method of claim 1, wherein the content comprises at least one of: a title associated with the first data object;

a user of the second software platform associated with the first data object; string content associated with the second software platform; and an identifier of the first data object.

4. The method of claim 1, wherein the input context is based at least in part on a user authenticated to the client interface.

5. The method of claim 4, wherein the input context is based at least in part on a role of the user defined by the second software platform.

6. The method of claim 4, wherein the input context is based at least in part on a user authenticated to the first software platform.

7. A method for generating a user interface element for a cross-platform automation system, the method comprising:

receiving, at a client device rendering a graphical user interface providing client-side functionality for a first software platform, a user input to an editable field rendered in respect of a first data object of the first software platform in the graphical user interface, the user input comprising an address pointing to a second data object of a second software platform different from the first software platform;

defining an input context with the first data object and the second data object;

sending, by the client device of the first software platform to at least one of the first software platform or the second software platform, a query based on the user input and the input context;

receiving at the client device of the first software platform in response to the query, an automation identifier corresponding to an automation of at least one operation of the first software platform or the second software platform, the automation configured to be triggered by a change in a property of at least one of the first data object or the second data object; and modifying the graphical user interface, by the client device, to display a selectable interface element that, when selected, causes the automation to be enabled.

8. The method of claim 7, wherein the selectable interface element is rendered as a floating element at least partially collocated with a location of the user input within the editable field.

9. The method of claim 7, wherein the first software platform is a collaboration documentation system and the second software platform is an issue tracking system.

10. The method of claim 7, wherein the property comprises one or more of a modified date of one of:

the first data object; or the second data object.

11. The method of claim 7, wherein:

the second software platform is a code repository platform;

the second data object comprises a code repository of the code repository platform; and the property triggering the automation changes in response to each pull request of the code repository.

12. The method of claim 11, wherein the automation comprises sending a notification to a user of the first software platform in response to each pull request of the code repository.

13. The method of claim 11, wherein:

the first software platform is a documentation platform;

the first data object comprises a documentation page of the documentation platform; and the automation comprises updating at least a portion of the documentation page in response to each pull request of the code repository.

14. The method of claim 11, wherein:

the first software platform is an issue tracking system;

the first data object comprises an issue tracked by the issue tracking system; and the automation comprises updating a status of the issue in response to each pull request of the code repository.

15. The method of claim 7, wherein the user input comprises pasting a uniform resource location into the editable field.

16. A cross-platform event system comprising: a host executing a first server-side instance configured to provide server-side functionality of a first software platform, the first server-side instance configured to:

communicably couple to a client-side instance configured to provide client-side functionality for the first software platform;

receive user input data from the client-side instance of the first software platform, the user input data generated in response to a first user input received at a graphical user interface of the client-side instance, the first user input comprising an address pointing to a data object of a second software platform;

defining an input context based at least in part on the first data object and the second data object;

select a set of trigger events based at least in part on the input context and on the user input data from a trigger event database, each selected trigger event associated with a respective one event pushed by one of the first software platform or the second software platform to an event-driven platform;

select a set of actions, from an event action database, that can be performed by at least one of the first software platform or the second software platform;

cause the client-side instance of the first software platform to modify the graphical user interface to present at least one trigger event from the set of trigger events and at least one action from the set of actions;

receive selection data from the client-side instance of the first software platform, the selection data generated in response to a second user input received at the graphical user interface, the second user input identifying a selected trigger event and a selected action;

define an event object comprising the selected trigger event and the selected action; and provide the event object as input to the event-driven platform in communication with the first software platform and the second software platform to configure the event-driven platform to cause the selected action to be executed in response to occurrence of the selected trigger event.

17. The cross-platform event system of claim 16, wherein the first user input is received as a text input to an editable user interface element rendered in the graphical user interface.

18. The cross-platform event system of claim 16, wherein the at least one trigger event corresponds to a change in a property of the data object.

19. The cross-platform event system of claim 16, wherein the selected action comprises notifying a specified user of at least one of the first software platform or the second software platform in response to occurrence of the selected trigger event.

* * * * *